(12) United States Patent
Munsinger et al.

(10) Patent No.: US 11,998,137 B2
(45) Date of Patent: Jun. 4, 2024

(54) COLD BREW COFFEE APPARATUS

(71) Applicant: National Presto Industries, Inc., Eau Claire, WI (US)

(72) Inventors: Aaron J. Munsinger, Elk Mound, WI (US); Michael R. Berge, Eau Claire, WI (US); Justun C. Seymour, Eau Claire, WI (US)

(73) Assignee: National Presto Industries, Inc., Eau Claire, WI (US)

( * ) Notice: Subject to any disclaimer, the term of this patent is extended or adjusted under 35 U.S.C. 154(b) by 83 days.

(21) Appl. No.: 17/541,006

(22) Filed: Dec. 2, 2021

(65) Prior Publication Data

US 2022/0167776 A1    Jun. 2, 2022

Related U.S. Application Data

(60) Provisional application No. 63/120,425, filed on Dec. 2, 2020.

(51) Int. Cl.
*A47J 31/20* (2006.01)
*A23F 3/18* (2006.01)
(Continued)

(52) U.S. Cl.
CPC ............... *A47J 31/20* (2013.01); *A23F 3/18* (2013.01); *A23F 5/26* (2013.01); *A47J 31/0615* (2013.01); *A47J 31/0636* (2013.01); *A47J 31/4403* (2013.01); *B01F 33/4533* (2022.01); *B01F 2101/14* (2022.01)

(58) Field of Classification Search
CPC ... A23F 3/18; A23F 5/26; A47J 43/046; A47J 31/20; A47J 31/0615; A47J 31/0636; A47J 31/4403; B01F 33/4533; B01F 35/52; B01F 2101/14
See application file for complete search history.

(56) References Cited

U.S. PATENT DOCUMENTS

| 10,575,672 B2 | 3/2020 | Rivera |
| 11,000,145 B2 | 5/2021 | Ballezzi |

(Continued)

*Primary Examiner* — Dana Ross
*Assistant Examiner* — Kuangyue Chen
(74) *Attorney, Agent, or Firm* — Kenneth A. Smith

(57) ABSTRACT

Disclosed is a cold brew coffee maker and related methods of making cold brew coffee. The cold brew coffee maker can include a rotation assembly, a brew chamber, and a strainer/stirrer assembly. The strainer/stirrer assembly is adapted to be insertable into the brew chamber. The strainer/stirrer assembly having a first and second impeller that are located at a bottom portion of the strainer/stirrer assembly, the first impeller being located externally to the strainer/stirrer assembly and the second impeller located within a chamber formed by the strainer/stirrer assembly. The brew chamber portion of the cold brew coffee maker being filled partially with water, the strainer/stirrer assembly placed into the brew chamber and the brew chamber placed atop the rotation assembly. Ground coffee is added to the chamber located within the strainer/stirrer assembly and the rotation assembly is energized such that the first and second impellers cause the ground coffee and water to be mixed until a desired amount of coffee flavor is imparted upon the water by the ground coffee.

7 Claims, 33 Drawing Sheets

(51) Int. Cl.
*A23F 5/26* (2006.01)
*A47J 31/06* (2006.01)
*A47J 31/44* (2006.01)
*B01F 33/453* (2022.01)
*B01F 101/14* (2022.01)

(56) References Cited

U.S. PATENT DOCUMENTS

| | | | |
|---|---|---|---|
| 11,064,836 B2 | 7/2021 | Rivera | |
| 2020/0268192 A1* | 8/2020 | Dubief | A47J 31/4492 |
| 2021/0059463 A1* | 3/2021 | Ellis | A47J 31/02 |

* cited by examiner

Section A-A

Section A-A

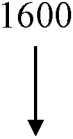 1600  1600  1600
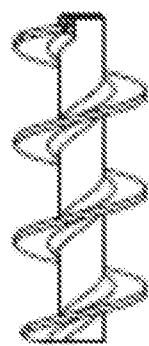 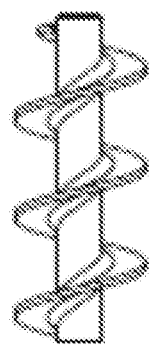 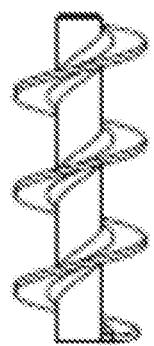
Figure 16A    Figure 16B    Figure 16C
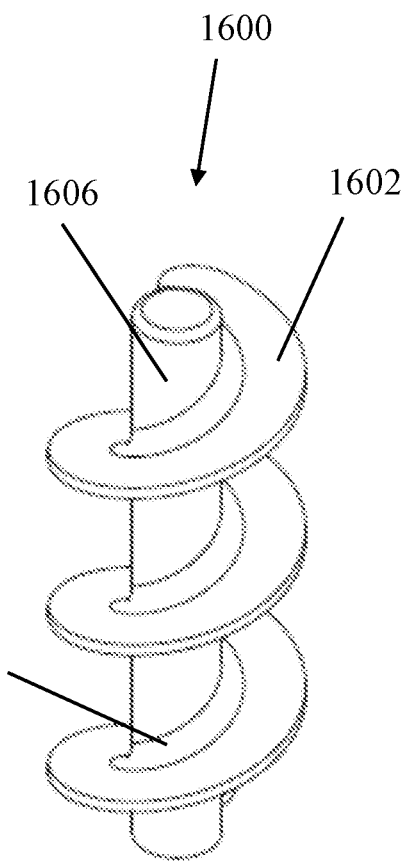
Figure 16D Section A-A

2708

2708

COLD BREW COFFEE APPARATUS

CROSS REFERENCE TO RELATED APPLICATIONS

This application claims priority to U.S. Provisional application 63/120,425 filed on Dec. 2, 2020 which is incorporated herein by reference in its entirety.

TECHNICAL FIELD

The present invention is directed to the field of coffee makers and related devices for and methods of brewing coffee. More specifically, the present invention is directed to a coffee maker including a brew chamber having removable filter and a rotatable component for use in making cold brew coffee, hot coffee, tea, infused water, and other beverages as well as methods of using such a coffee maker.

BACKGROUND

Where a coffee plant is grown, the amount of sunlight and water the coffee plant receives, and how resulting coffee beans are roasted all greatly impart a unique and distinct taste to the coffee bean. However, the way coffee is brewed can be just as influential on the resulting flavor profile. Coffee beans contain various solubles such as oils and acids that when the beans are ground and brewed in water, give the resulting coffee distinct flavors. Some of the ways to adjust the strength, flavor, and acidity profile of coffee include varying the temperature of water used to brew the coffee and the length of contact between the water and the beans (steeping time).

Conventionally, coffee is a hot brewed beverage formed by passing heated water through coffee beans that have been roasted and ground (ground coffee). When hot water of a certain temperature is introduced to ground coffee, solubles from the ground coffee dissolve, resulting in a hot coffee beverage having a full-bodied flavor. Aromatics are also extracted during this brewing process. However, when using hot water, these aromatics begin to degrade and oxidize during brewing. The result can be hot coffee having a somewhat bitter, sour, and/or acidic taste. Hot coffee typically has a pH ranging around 5 or slightly lower. This low pH can cause some consumers to experience stomach irritation. For consumers suffering pre-existing conditions such as acid reflux or frequent heartburn, hot coffee is often restricted entirely or suggested for consumption only in moderation. Coffee brewed in this manner is generally served hot or alternatively, cold by pouring the coffee over ice.

Unlike hot coffee poured over ice, or using leftover hot coffee to make cold coffee beverages, cold brew coffee is a brewed beverage formed by steeping roasted and ground coffee beans in cold water. To produce a beverage with a desired level of coffee flavor, this process generally takes 12 to 24 hours. During the cold brew steeping process, the solubles typically extracted in hot brewed coffee, including oils and acids that give hot brewed coffee its signature taste and aroma, are released more slowly and over a longer period of time. This cold brew steeping process can result in a coffee beverage that is less bitter and up to 65% less acidic than traditional hot brewed coffee. Because of the decrease in acidity and bitterness, cold brew coffee appeals to a wide variety of consumers, especially those that typically avoid the acidity and bitterness of hot coffee.

In recent years, the consumption and popularity of coffee prepared by a cold brew process has increased substantially. This increase in popularity has led to a corresponding increase in the number of options consumers have when selecting a cold brew coffee beverage. Ready-made beverages at retail stores, menu selections at coffee shops, and a variety of home brew methods are all available options when consumers are selecting a cold brew beverage. While the options for cold brew are abundant, there are some factors inherent to the cold brew process that decrease the appeal of the beverage.

While ready-made, pre-packaged beverages often appeal to consumers who want a quick and easy, on the go beverage, these beverages are often costly. Coffee shops can make cold brew in advance and thus provide an attractive option for those seeking cold brew beverages who lack the time or storage space to brew cold brew coffee. Unfortunately, these conveniences come at a cost and can also be inconvenient because the consumer has to travel to the location of the shop and after making the trip, frequently finds that their coffee shop has sold out of cold brew coffee. An increasingly popular alternative to ready-made, pre-packaged cold brew beverages and coffee shop options is for consumers to make their own cold brew coffee at home or their office.

Despite increasing interest in brewing cold brew coffee at home, the principles of making cold brew coffee have remained relatively the same. One such method of making cold brew coffee at home is through the use of an immersion method in which ground coffee is placed in a large pot or container and water is poured over the grounds. The grounds are left to steep for at least 12 hours, at which time the mixture is poured through a filter, separating the liquid and grounds. For smaller batches of cold brew coffee, a French Press coffee maker can be used to filter the coffee grounds from the water/coffee grounds mixture after the steeping process has achieved a desired flavor level. Although such methods are relatively simple and straightforward, both require the grounds to be stirred throughout the 12 hours steeping process.

An alternative method of producing cold brew coffee is the use of an ice drip coffee tower. An ice drip coffee tower generally comprises an upper chamber that is filled with ice, a middle chamber filled with coffee grounds, and a lower chamber to receive the liquid. Over time, ice in the upper chamber melts and drips over the grounds in the middle chamber. The liquid slowly seeps through the grounds and is received in the bottom chamber. A major drawback to using the ice drip coffee tower is its price, which can be in the hundreds of dollars and despite the price, this method still requires a considerable amount of time to complete.

Slow drip coffee makers are yet an even other alternative method for making cold brew coffee. This method requires placing grounds in a supported filter that is rested on or placed above a receiving container. A pre-determined amount of water is poured over the grounds and over time the water seeps through the grounds into the receiving container. The simplicity of this method is appealing, but it still requires a considerable amount of time for the slow-drip process to be completed.

As popularity and demand for cold brew coffee increases, there remains a need to improve upon devices and methods that consumers use to make cold brew coffee. Additionally, an improved method is needed that reduces the time required to steep or brew cold-brew coffee as well as providing the user with a convenient way to remove the ground coffee from the coffee mixture when the process is complete.

SUMMARY

The exemplary embodiments disclosed herein relate to cold brew coffee makers and methods for brewing cold brew coffee using the cold brew coffee makers. More specifically, exemplary embodiments of a cold brew coffee maker include a base assembly, a rotation assembly, a strainer/stirrer assembly and a brew chamber.

A cold brew coffee maker according to an exemplary embodiment comprises a rotation assembly, a strainer/stirrer assembly, and a brew chamber. The rotation assembly comprises a control knob and a rotatable magnetic assembly. The control knob and rotatable magnetic assembly are used to induce a rotating magnetic field at an upper mounting surface of the rotation assembly. In an exemplary embodiment, the rotation assembly comprises an internal rotatable magnetic assembly for generating rotational movement of a selectively attachable impeller component of a strainer/stirrer assembly. The strainer/stirrer assembly comprises an upper and lower housing, a first impeller located at a lower end of the strainer/stirrer assembly.

In another exemplary embodiment, a strainer/stirrer assembly comprises an upper mounting ring adapted to rest on an upper rim of a brew chamber, the upper mounting ring comprising a cover which in a first position allows access to a chamber formed by the strainer/stirrer assembly and in a second position covers an upper opening of the strainer/stirrer assembly.

In another exemplary embodiment, a lower edge of the strainer/stirrer assembly comprises a tab which extends from the lower edge and is adapted to engage a surface of an upper mounting ring such that the strainer/stirrer assembly can be suspended above the brew chamber such that liquid from a chamber formed by the strainer/stirrer assembly drains into the brew chamber.

In another exemplary embodiment a strainer/stirrer assembly comprises an upper and lower housing, a first impeller located at a lower end of the strainer/stirrer assembly, and a second impeller located within a chamber formed by the strainer/stirrer assembly, the strainer/stirrer assembly further comprises a removable end cap through which a shaft extends, the first impeller assembly affixed to a first end of the shaft and a second impeller attached to the second end of the shaft. In an exemplary embodiment, the second impeller is removably attached to the second end of the shaft.

In yet another exemplary embodiment, the second impeller of the strainer/stirrer assembly comprises a shaft that extends into the chamber formed by the strainer/stirrer assembly, the shaft having a plurality of mixing arms extending radially outward from the axis of the shaft.

In yet another exemplary embodiment, the second impeller of the strainer/stirrer assembly comprises a shaft that extends into the chamber formed by the strainer/stirrer assembly, the shaft having a mixing surface that extends radially outward from the axis of the shaft, the mixing surface spiraling along the shaft to form an auger shape.

In exemplary embodiments, the removable end cap of the strainer/stirrer assembly comprises openings configured to allow a liquid to flow through portions of the end cap.

In other exemplary embodiments, the cold brew coffee maker described herein brews hot coffee by using hot or warm water or by heating the brewed water produced by the cold brew coffee maker.

In other exemplary embodiments, the cold brew coffee maker can be used with tea, fruit, or herbs and spices to produce beverages other than coffee.

The above summary is not intended to describe each illustrated embodiment or every implementation of the invention. Rather, the exemplary embodiments are chosen and described so as to provide an overview or framework for understanding the nature and character of the claimed aspects and implementations so that those skilled in the art can appreciate and understand the principles and practices of the invention. The Figures and the detailed description that follow more particularly exemplify these exemplary embodiments, and are incorporated in and constitute a part of this specification.

BRIEF DESCRIPTION OF THE DRAWINGS

These and other features and advantages of the present invention will become better understood with regard to the following description and accompanying drawings in which:

FIGS. 16A to 16D illustrate an internal stirrer portion according to another exemplary embodiment;

Figure 1:
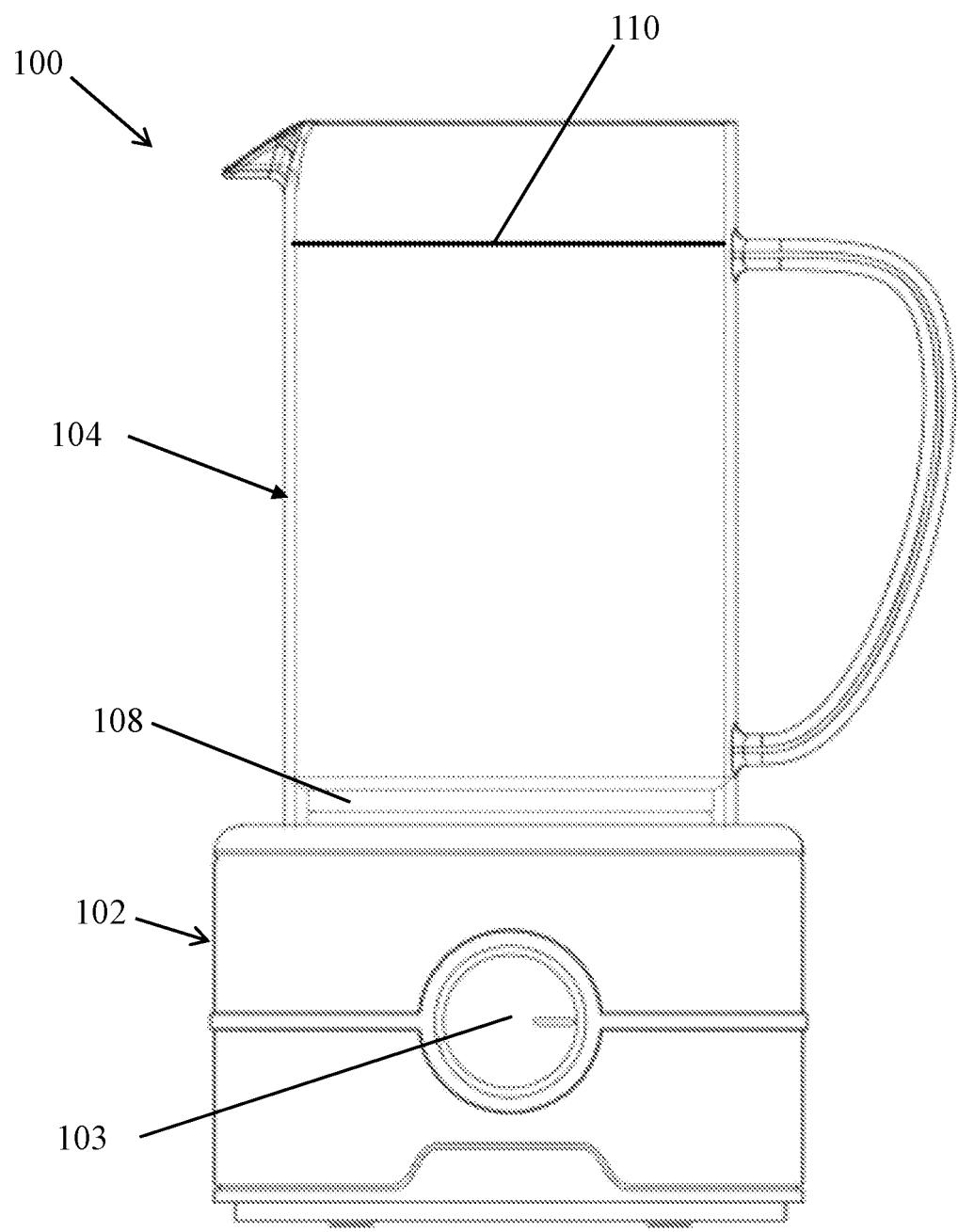
FIG. 1 is a cold brew coffee maker according to an exemplary embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

As illustrated in FIG. 1, an exemplary embodiment of a cold brew coffee maker 100 can comprise a rotation base assembly 102 and a brew chamber 104. Exemplary Cold brew coffee makers 100 are generally fabricated of materials compatible with temperatures associated with brewing cold coffee and hot coffee as well as cleaning and sanitizing following the coffee brewing process. In exemplary embodiments, the rotation base assembly 102 and brew chamber 104 are comprised of materials suitable for food contact. Certain exemplary embodiments are compatible with conventional dishwashing methods such as, for example, glass, plastics such as polycarbonate and polyethylene, and material such as stainless steel. In exemplary embodiments, the rotation base assembly 102 comprises a control knob 103 positioned on the exterior of the rotational base assembly. In exemplary embodiments, the control knob 103 is generally used to control the speed of a rotating magnetic field generated by a magnetic assembly (not shown) located internally to the rotation base assembly such as, for example, a rotating magnet or set of stationary electromagnets that are energized in sequence to create a rotating magnetic field. While the Figures presented herein illustrate a control knob 103 as the means for controlling the rotation of the rotating magnetic field, other exemplary embodiments can use control methods such as, but not limited to, on/off switches, multi-position switches, or pushbuttons. Additionally, certain exemplary embodiments may utilize control functions or behaviors such as a soft-start function, a timed multi-speed function wherein the rotation speed varies over time according to a predetermined pattern of behavior, or a timer function wherein the start of rotation may be delayed or rotation may be ended after a predetermined time. In exemplary embodiments, the rotating magnetic field is magnetically coupled to a stirring portion which will be further described herein.

Figure 2:
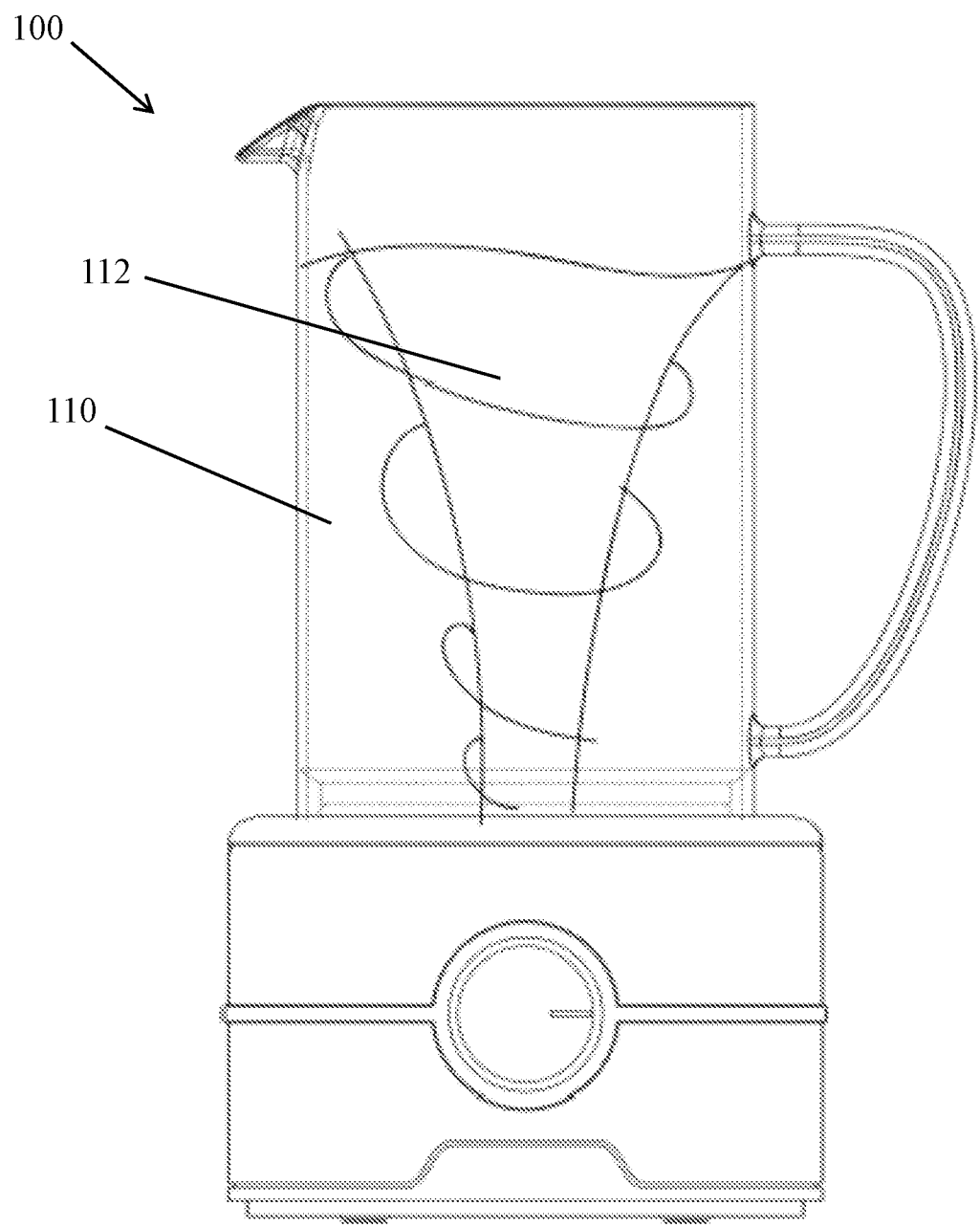
FIG. 2 is the cold brew coffee maker of FIG. 1, shown in operation prior to the addition of ground coffee.
Figure 3:
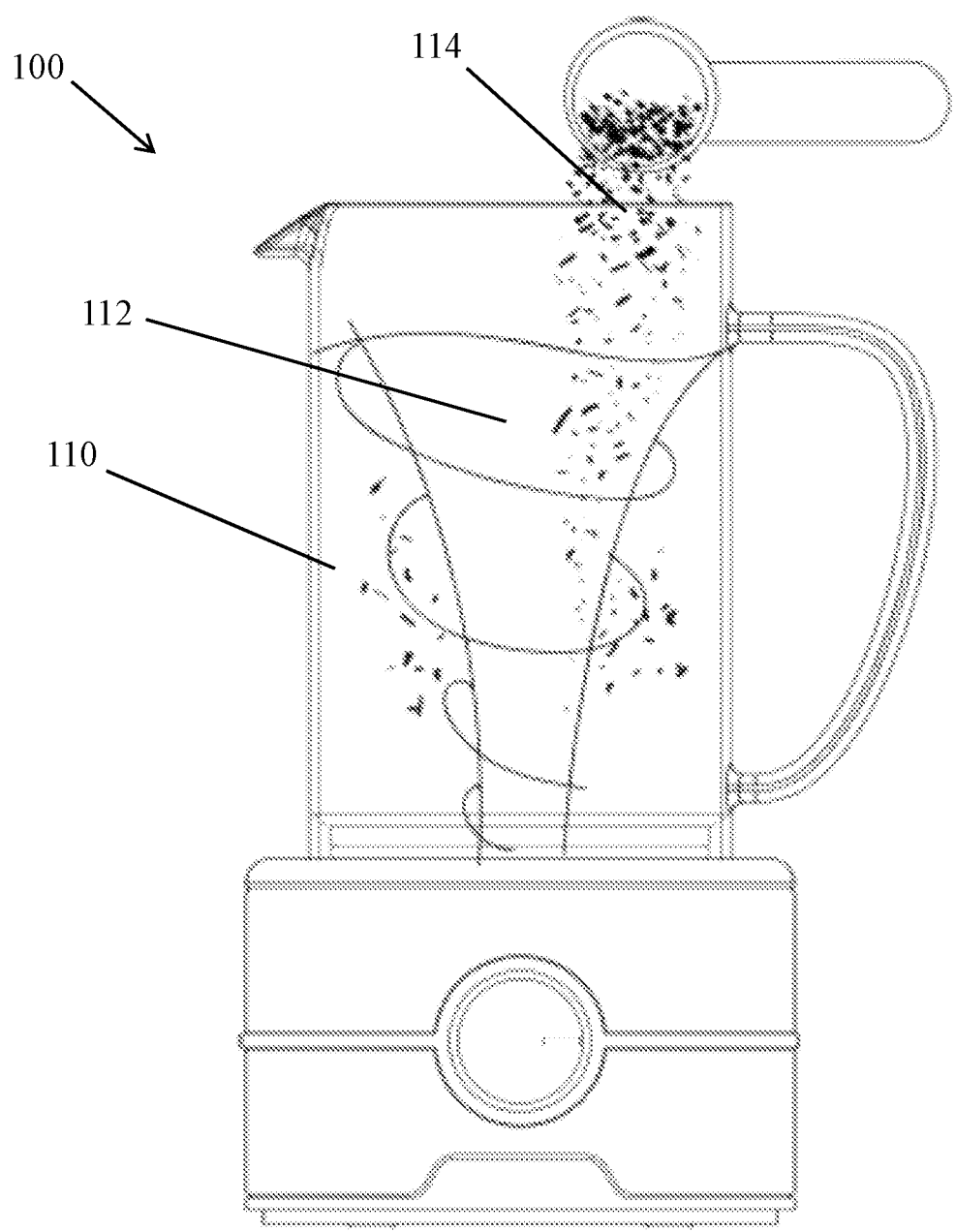
FIG. 3 is the cold brew coffee maker of FIG. 1, shown in operation as coffee is added.

As illustrated in FIG. 2, the magnetic assembly located internally to the rotation base assembly 102 is caused to rotate. This rotation causes a stirring portion (not shown in FIG. 2) positioned near the lower portion of the brew chamber 104 to rotate which causes a vortex 112 to form in the water 110. As illustrated in FIG. 3, ground coffee (ground coffee beans) 114 is added to the water 110. The vortex 112 causes the ground coffee 114 to be mixed with the water 110. The ground coffee and water mixture is then allowed to be continuously mixed by the vortex 112 until a desired level of flavor is attained in the brewed coffee formed from the water 110 and ground coffee 114. In order to be served as a beverage, the ground coffee 114 should be removed from the brewed coffee. In addition to other disclosures, improvements to the process of removing the ground coffee 114 from the brewed coffee are disclosed by the following exemplary embodiments.

Figure 4:
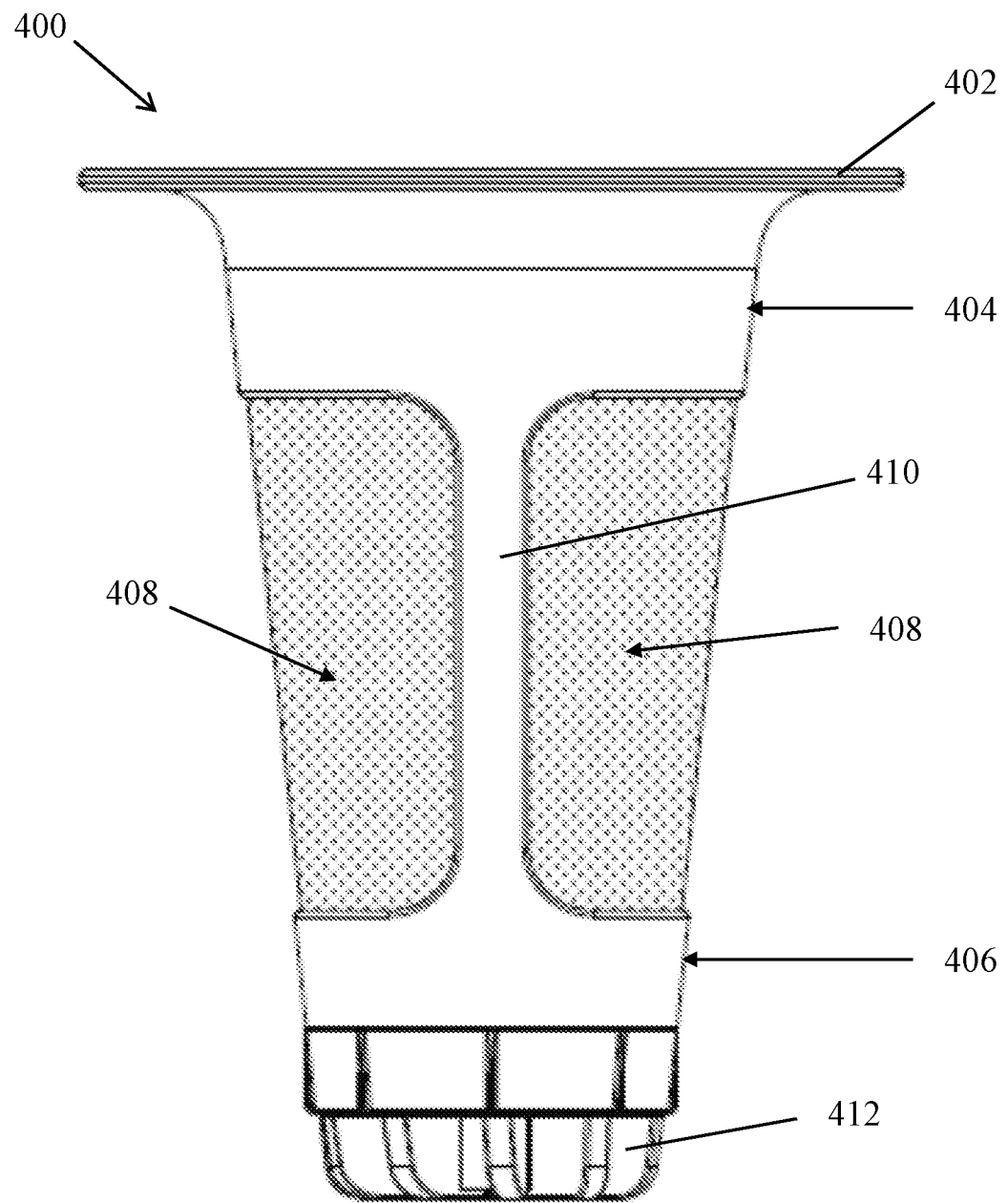
FIG. 4 is a left-side view of a strainer with integral stirrer according to an exemplary embodiment.
Figure 5:
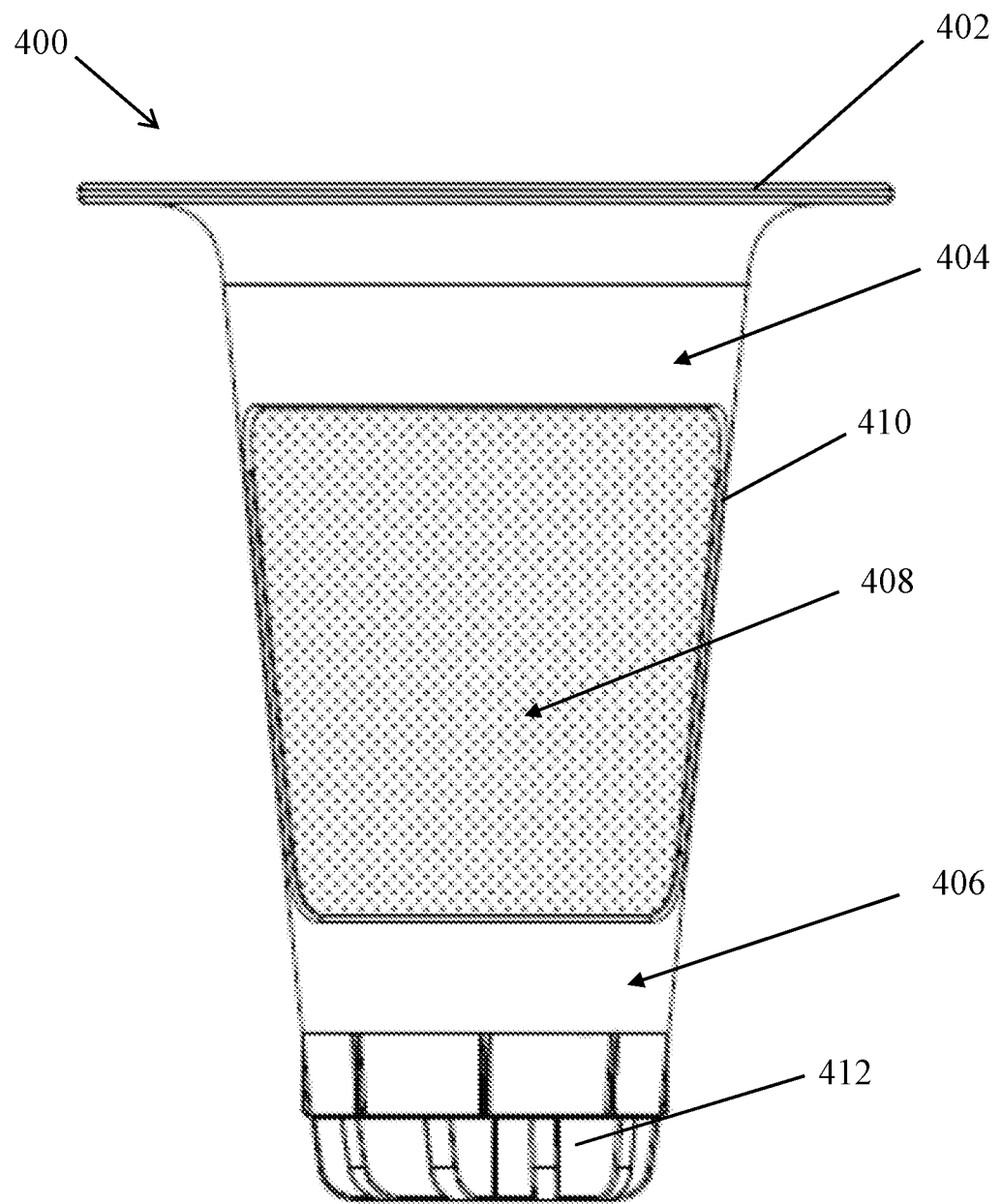
FIG. 5 is a front view of the strainer with integral stirrer of FIG. 4.
Figure 6:
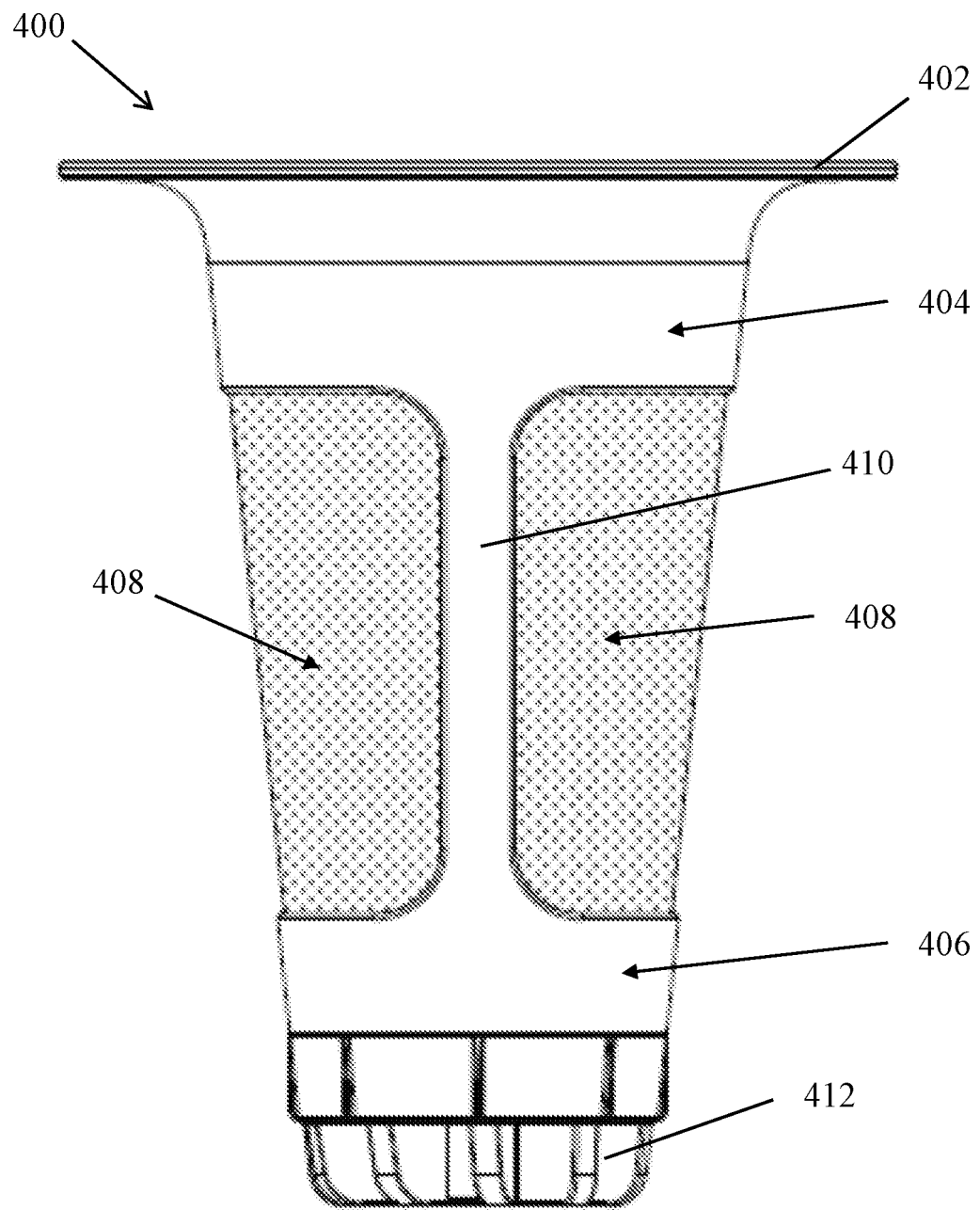
FIG. 6 is a right-side view of the strainer with integral stirrer of FIG. 4.
Figure 7:
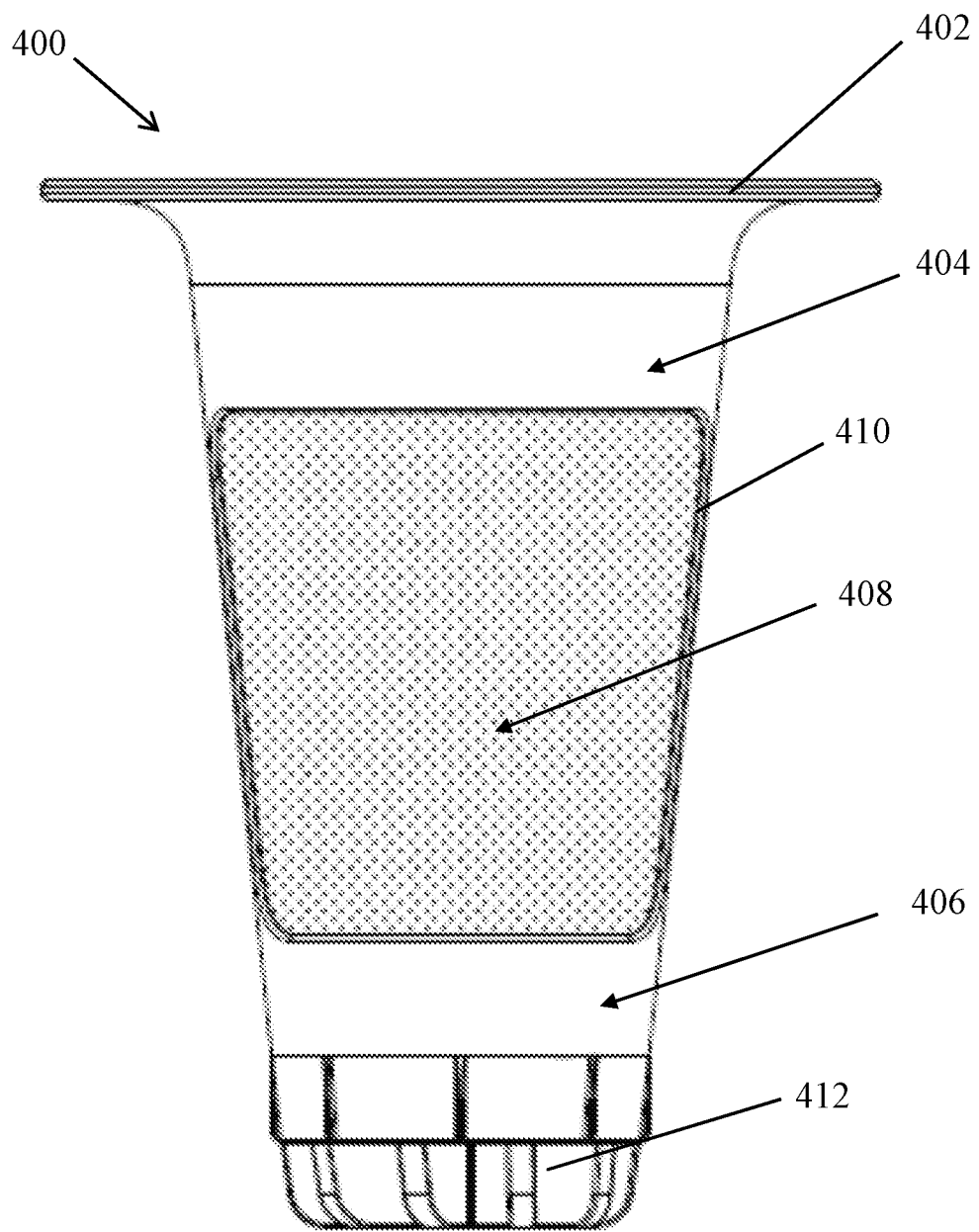
FIG. 7 is a rear view of the strainer with integral stirrer of FIG. 4.
Figure 8:
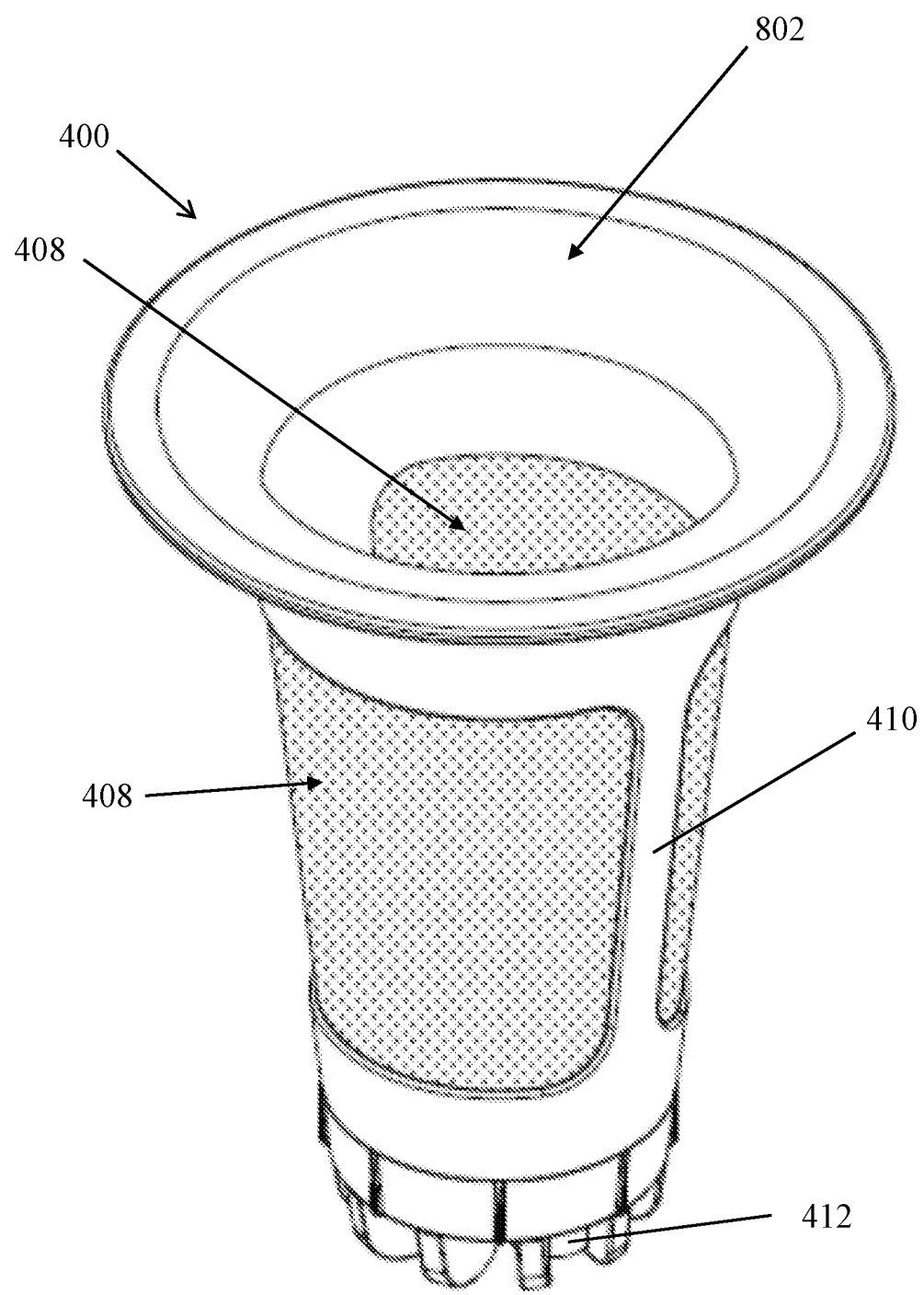
FIG. 8 is a perspective view of the strainer with integral stirrer of FIG. 4.

FIG. 4 illustrates a strainer/stirrer assembly (hereinafter, "strainer") 400 according to an exemplary embodiment. As illustrated, the strainer 400 comprises an upper supporting surface 402, an upper body portion 404, a lower body portion 406, and a filter portion 408. The filter portion 408 is illustrated by a series of dots representing perforations but other exemplary embodiments may comprise screen, mesh, or similar filtering media that allows brewed coffee to pass through the filter portion 408 while retaining ground coffee with the strainer 400. A side pillar 410 provides rigidity to the strainer 400 so as to maintain the relative spacing of the upper body portion 404 and the lower body portion 406. FIGS. 5-8 illustrate front, side, back, and perspective views of the strainer of FIG. 4. As can be observed in FIG. 8, the filter portion 408 is exposed along both portions of the inner and outer surfaces of the strainer 400. This exposure allows water 110 to flow with minimal restriction between the inner and outer surfaces of the strainer 400.

Figure 9:
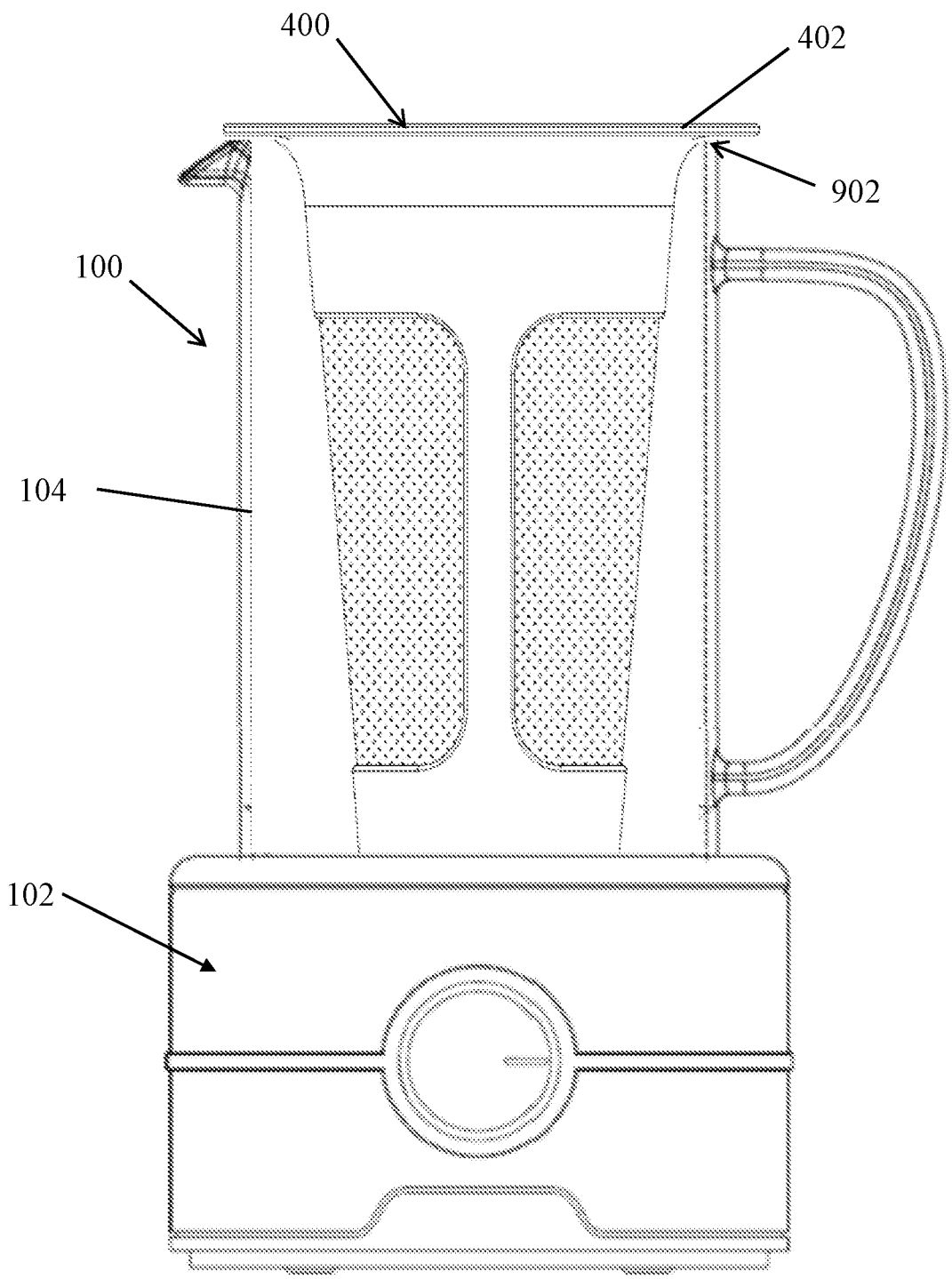
FIG. 9 is an illustration of a cold brew coffee maker having a strainer with an integral stirrer installed thereto.

An exemplary embodiment of a strainer 400 may be used in conjunction with the cold brew coffee maker 100 illustrated in FIGS. 1-3. This is illustrated in FIG. 9, which shows a strainer 400 positioned within the brew chamber 104 of a coffee maker 100. In the illustrated exemplary embodiment, the upper supporting surface 402 of the strainer 400 rests on an upper edge 902 of the brew chamber 104. As is visible in FIG. 4 and the strainer 400 bottom view of FIG. 10 but hidden by the rotation base assembly 102, an impeller 412 is positioned at the base of the strainer 400. This impeller 412 is configured with magnets or ferrous portions 1002 such that the magnetic assembly (not shown), located in the rotation base assembly 102, is coupled magnetically to the impeller 412. Thus, when the magnetic assembly rotates, the impeller 412 also rotates. When in use, the impeller 412 is immersed in water found at the bottom of the brew chamber 104 (see FIG. 2). The rotation of the impeller 412 causes a vortex to be formed in the water located in the brew chamber 104.

Figure 11:
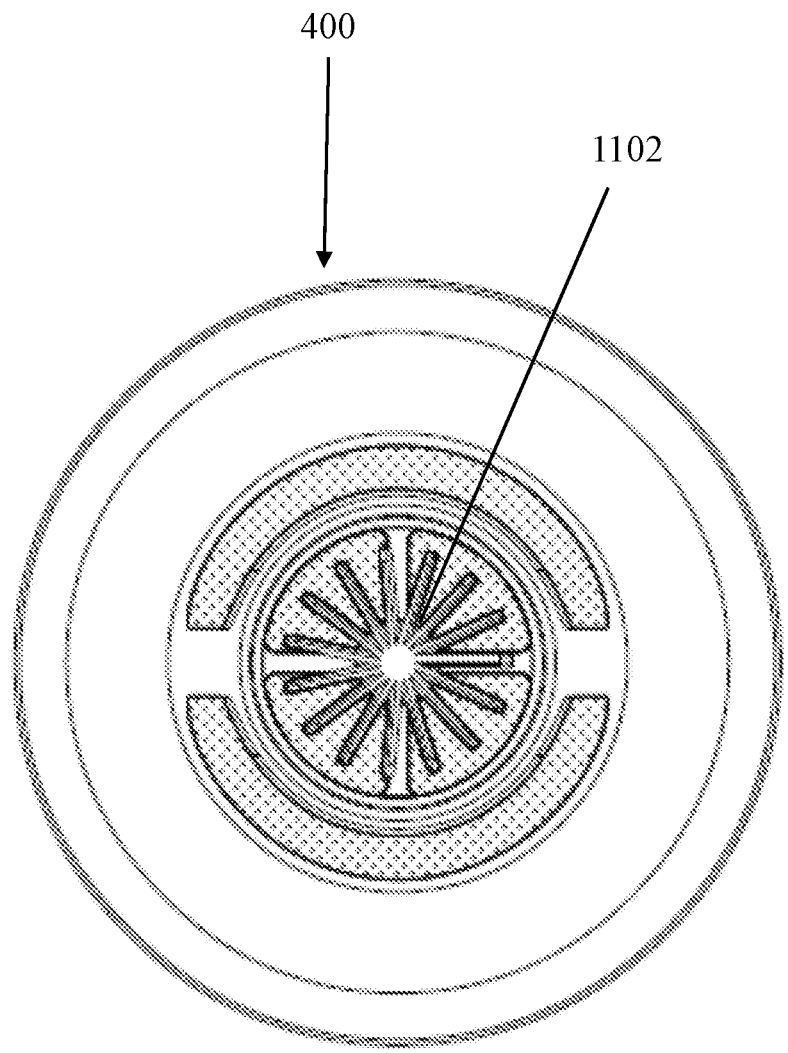
FIG. 11 is a top view of the strainer with the integral stirrer of FIG. 4.

The result of the vortex formation is that the water present in the brew chamber 104 circulates within the brew chamber 104, flowing through the filter portion 408 of the strainer assembly 400. Ground coffee is introduced into the water in a manner similar to the process illustrated in FIG. 3. The ground coffee and water mixture is allowed to continuously mix by the vortex as was described previously herein. Because the strainer 400 occupies a space inside the brew chamber 104, and despite the fact that water can pass through the filter portion 408, the vortex that results from the rotation of the impeller 412 may be less vigorous than those of coffee makers 100 used without a strainer 400 such as is illustrated in FIGS. 1-3. In order to improve the vortex formation and mixing action in some exemplary embodiments, a second impeller device may be located within the strainer 400. Such a second impeller 1102 is visible in the top view of the strainer 400 illustrated in FIG. 11. FIG. 11 illustrates a view of the inside portion of the strainer 400. In the illustrated exemplary embodiment, the second impeller 1102 is located at the lower body portion 406 of the strainer 400. In such exemplary embodiments the second impeller 1102 is mechanically coupled to the impeller 412 located at the base of the strainer 400 such that both the first impeller 412 and the second impeller 1102 rotate as the result of the magnetically coupled rotation of the magnetic assembly located in the rotation base assembly 102.

Figure 10:
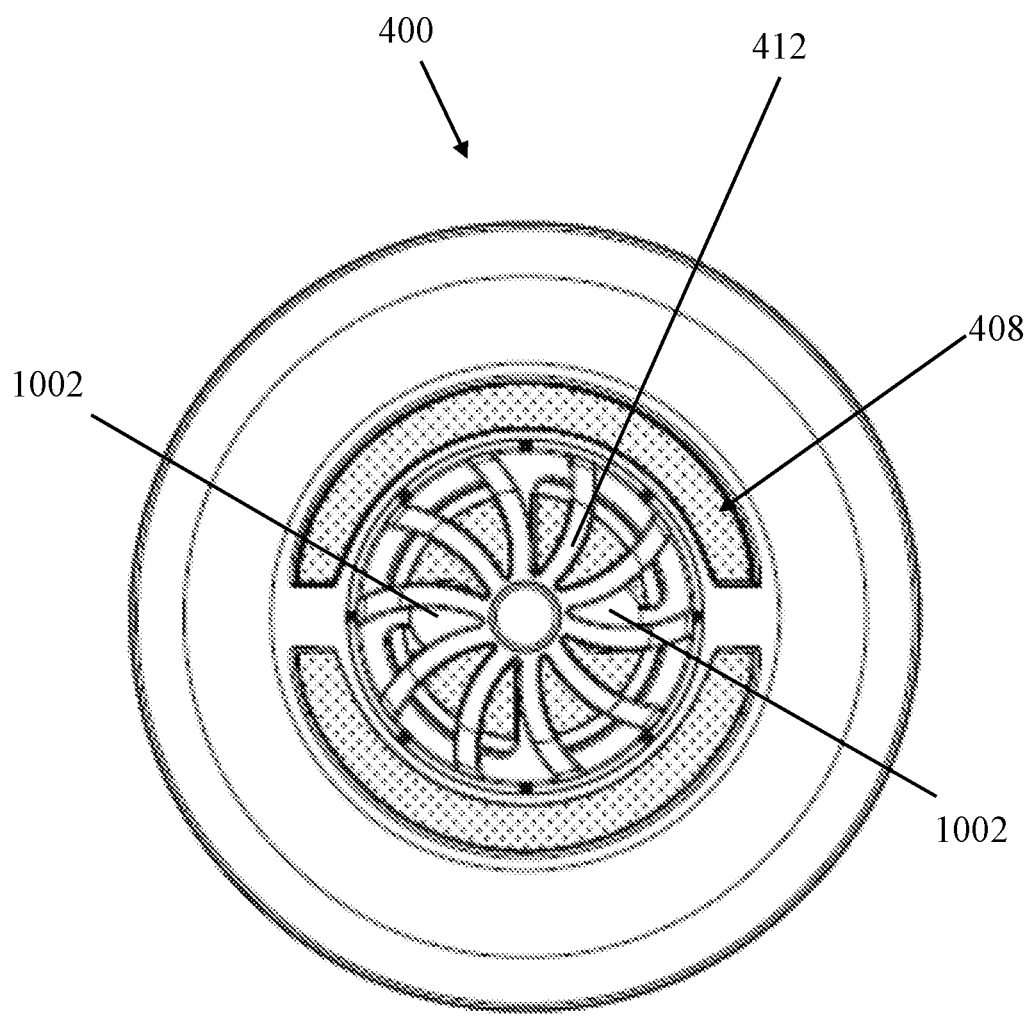
FIG. 10 is a bottom view of the strainer with the integral stirrer of FIG. 4.
Figure 12:
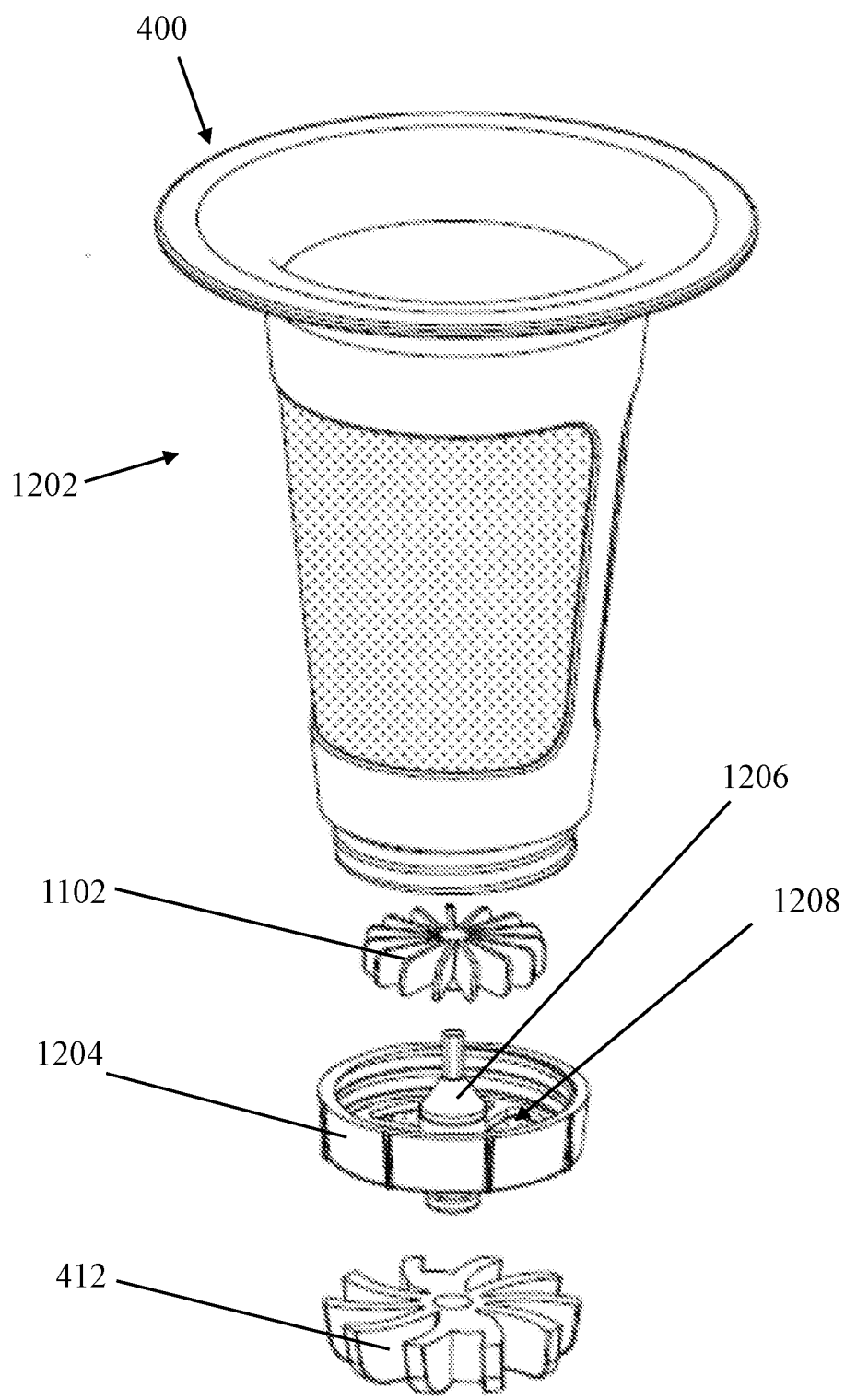
FIG. 12 is an exploded view of the strainer with the integral stirrer of FIG. 4 which illustrates the stirring components of a strainer with integral stirrer according to an exemplary embodiment.

FIG. 12 illustrates an exploded view of the strainer 400 according to an exemplary embodiment. Shown is the strainer body 1202, the second impeller 1102, a base cap 1204, and the first impeller 412. Visible in the base cap 1204 is a spindle 1206 which extends through the base cap 1204 and is configured such that it will rotate freely relative to the base cap 1204. Even though the second impeller 1102 and the first impeller 412 are illustrated as not connected to the spindle 1206 in FIG. 12, in certain embodiments, one or both may be permanently affixed to the spindle 1206. As is illustrated, the base cap 1204 may be threaded to allow a user to easily remove it from the strainer 400 for cleaning or other maintenance. As is shown at 1208, in certain exemplary embodiments, the base cap 1204 may comprise openings, a mesh, screen, filter, or other provisions to allow water to flow through the base cap 1204. Such provisions are also illustrated in FIGS. 10 and 11. Allowing water to flow through the base cap 1204 may further facilitate the formation of a vortex and the mixing of water and ground coffee within the strainer 400.

Figures 13A, 13B:
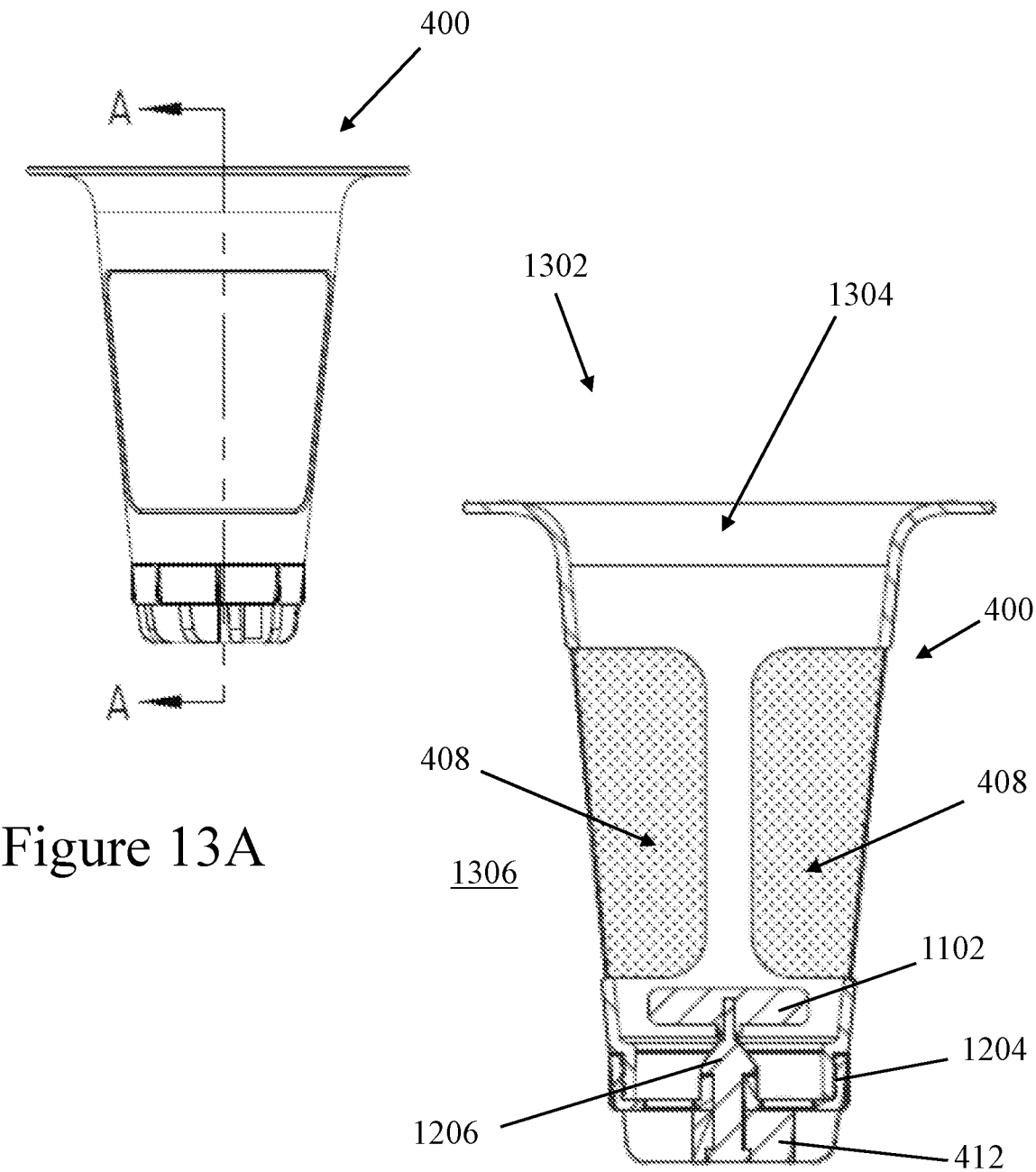
FIGS. 13A and 13B illustrate a side view and cross-section view of a strainer with an integral stirrer according to an exemplary embodiment.

A cross-section view 1302 of the strainer 400 of FIG. 13A is illustrated in FIG. 13B. This cross-section view 1202 shows the strainer 400 including the base cap 1204, the first impeller 412 and second impeller 1102 affixed to the spindle 1206. When in use, ground coffee placed in the inner space 1304 formed by the strainer 400. The first impeller 412 is caused to rotate by the interaction of magnetic elements in the rotation base assembly 102 with elements comprised by the first impeller 412. The rotation of the first impeller is transmitted by the spindle 1206 to the second impeller 1102. When the first impeller 412 and the second impeller 1102 rotate, their rotation action causes water (not illustrated) to form a vortex which draws the water downward and through the openings 1208 formed in the base cap. The water thus flows to the space 1306 formed between the outer surface of the strainer 400 and the brew chamber walls (not shown), whereupon it is drawn in through the filter portion 408 to repeat the process of being drawn downward. Thus, the water repeatedly passes through the ground coffee located in the inner space 1304 of the strainer 400. The filter portion 408 and the openings 1208 formed in the base cap serve to trap the ground coffee within the strainer.

During the circulation of the water described above, the ground coffee may be drawn to the bottom of the strainer 400. The second impeller may also serve to direct the ground coffee upward in the inner space portion of the strainer 400 to keep the ground coffee from collecting at the bottom of the strainer, thus keeping the ground coffee suspended in the circulating water. The result may be an improved brewing process as more surfaces of the ground coffee are continuously kept in contact with the water circulating through the strainer 400.

Figure 14A:
FIGS. 14A to 14D illustrate an internal stirrer portion according to an another exemplary embodiment.
Figure 14B:
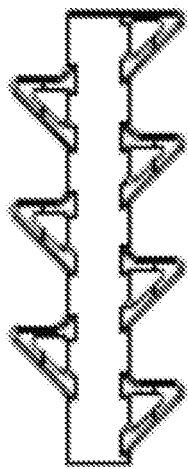
Figure 14C:
Figure 14D:
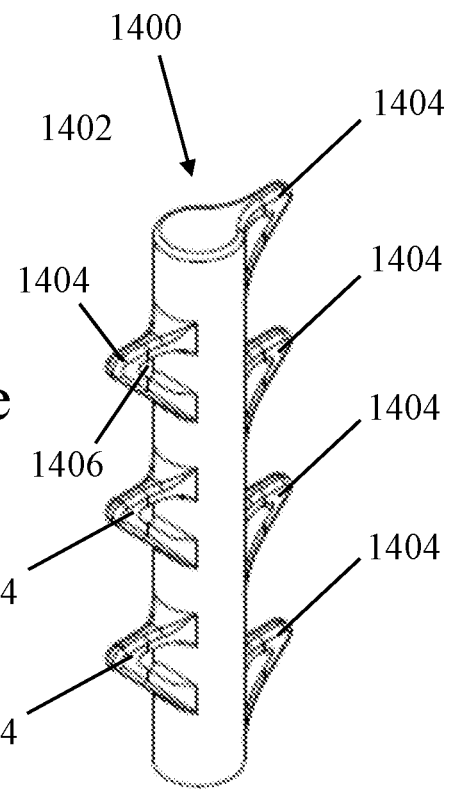
Figures 15A, 15B:
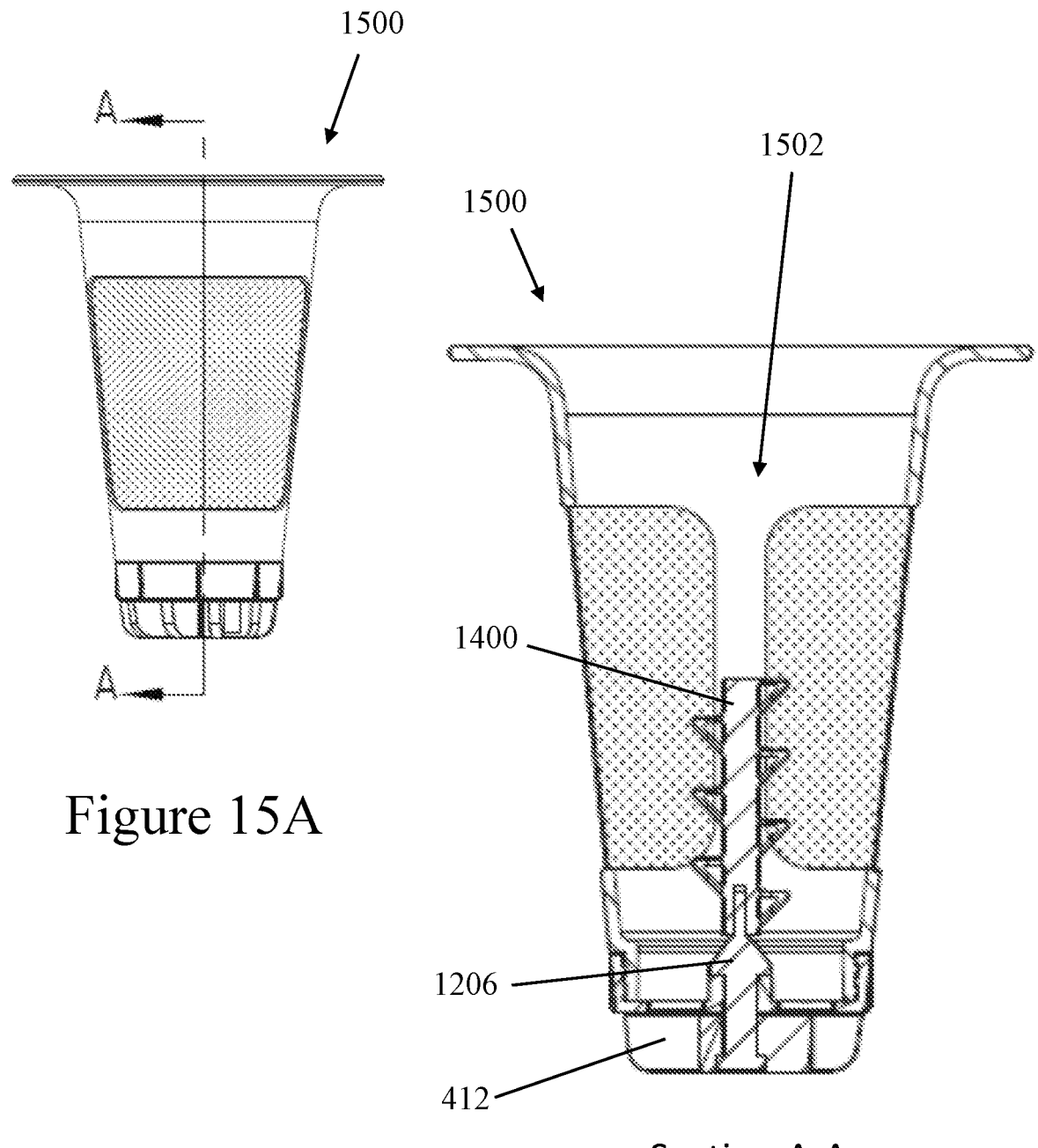
FIGS. 15A and 15B illustrate a side view and cross-section view of a strainer with integral stirrer as illustrated in FIGS. 14A-14D.

In addition to the second impeller 1102 illustrated in FIGS. 11-13, other impeller designs may be used in certain embodiments to enhance the circulation between water and coffee grounds located within the strainer 400. FIGS. 14A-14D illustrate one such exemplary embodiment. As shown in FIG. 14D, the second impeller 1400 comprises a shaft 1402 and a plurality of stirring arms 1404. As illustrated, in certain exemplary embodiments, the stirring arms 1404 may comprise openings 1406. However, other embodiments may be formed without the openings 1406. Embodiments may comprise a greater or few number of stirring arms 1404 and certain embodiments may be configured such that the stirring arms are located at various locations radially round the circumference of the shaft 1402 rather than being opposed at 180 degrees as illustrated in FIG. 14. Certain embodiments may position the stirring arms 1404 opposite from each other along the shaft 1402 rather than being spaced in an alternating pattern as illustrated in FIGS. 14A-15D. FIGS. 15A and 15B illustrate the second impeller 1400 of FIGS. 14A-15D installed in a strainer 1500. FIG. 15B shows a cross-section view of FIG. 15A in which a cross-section of the second impeller 1400 is shown mounted on a spindle 1206. As was described earlier herein, the first impeller 412 is caused to rotate by the interaction of magnetic elements in the rotation base assembly 102 with elements comprised by the first impeller 412. The rotation of the first impeller 412 is transmitted by the spindle 1206 to the second impeller 1400. In comparison to the second impeller 1102 illustrated in FIGS. 11, 12, and 13A-13B, the second impeller 1400 of FIGS. 14A-15D extends farther into the chamber 1502 formed by the strainer 1500. In certain circumstances, this extension allows for an increased level of agitation of the ground coffee and water mixture than that provided by the second impeller 1400 of FIGS. 14A-14D. This may be beneficial in circumstances in which the ground coffee is prone to clump together or simply when an increased level of mixing is desired. Although the second impeller 1400 is illustrated as extending approximately ½ way into the chamber 1502, other exemplary embodiments may extend a greater or lesser amount into the chamber 1502 without departing from the spirit of the disclosed design.

Figures 17A, 17B:
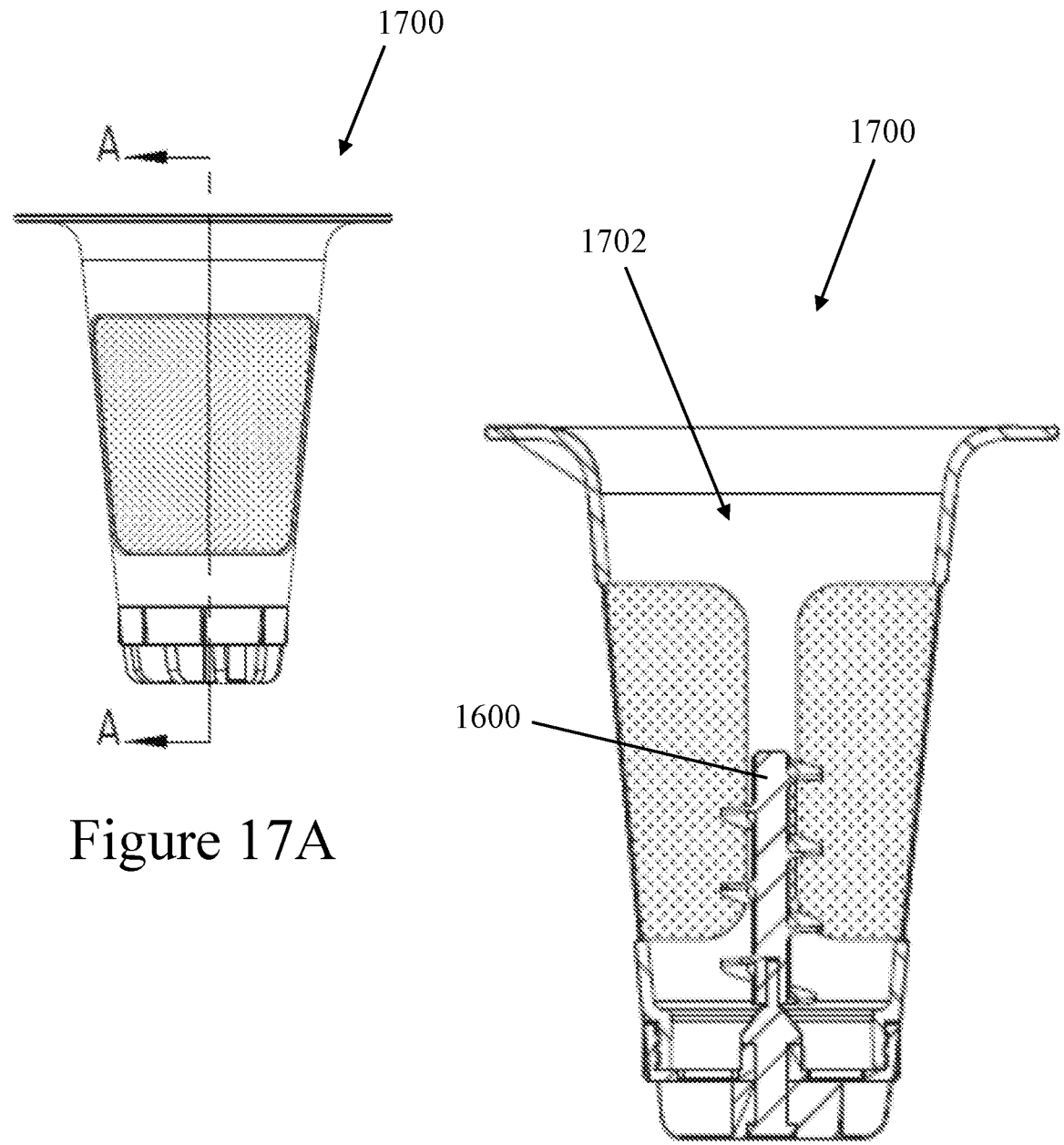
FIGS. 17A and 17B illustrate a side view and cross-section view of a strainer with integral stirrer as illustrated in FIGS. 16A-16D.

An alternate exemplary embodiment of a second impeller 1600 is illustrated in FIGS. 16A-16D. A back view of the second impeller 1600 is shown in FIG. 16A while left and right side views are shown in FIGS. 16B and 16C. FIG. 16D illustrates a front perspective view of the second impeller 1600 of FIGS. 16A-16C. As is shown, the second impeller 1600 in the illustrated embodiment comprises a spiral or screw-type agitation element 1602. As illustrated, the agitation element 1602 would cause an upward movement of ground coffee and water when the second impeller is rotated in a clockwise direction. Such an upward movement would serve to prevent ground coffee from accumulating in the base of the strainer 1700 illustrated in FIG. 17A. The number of rotations of the agitation element 1602 illustrated is approximately 3 turns however, a greater or lesser number of turns may be used in other exemplary embodiments. Additionally, the direction of movement caused by the second impeller 1600 may be varied in other exemplary embodiments. For example, in another exemplary embodiment, the agitation element 1602 may be oriented such that a counterclockwise rotation of the agitation element second impeller causes an upward movement of ground coffee and water in the strainer 1700. In certain exemplary embodiments, a fillet 1604 or ramp shape may be formed at the junction of the agitation element 1602 and a central shaft 1606 of the second impeller 1600. In certain exemplary embodiments, this may function to stiffen the agitation element 1602 so as to prevent flexing. Such a fillet 1604 may also function to reduce an accumulation of ground coffee in the area around the central shaft 1606. As is shown in FIG. 17B, the second impeller 1600 extends into a chamber 1702 formed in the interior portion of the strainer 1700. As was the case with the second impeller 1400 of FIGS. 14A-14D and 16A-16B, the exemplary second impeller of FIG. 17B 1600 may extend ½ way into the chamber 1702 or may extend a greater or lesser amount.

In certain exemplary embodiments, the second impeller may be removably attached to the spindle 1206 such that a user could select from a plurality of second impeller designs such as, but not limited to, those illustrated in FIGS. 11, 12, 13A-13B, 14A-14D, 15A-15B, 16A-16D, and 17A-17B. Alternatively, the second impeller may be removably attached to facilitate cleaning.

Referring to FIGS. 1-3 and 9, when in use, a brew chamber 104 is filled with a desired amount of water 110. A strainer 400 is placed within the brew chamber 104 such that the water will flow through the filter portions 408 and enter the inner chamber formed by the strainer 400. The control knob 103 is adjusted so as to form a vortex similar to the vortex 112 shown in FIG. 2, but located predominantly within the inner chamber of the strainer 400. Ground coffee 114 is then added to the inner chamber of the strainer 400 and allowed to mix with the water. Depending upon the embodiment of the first impeller 412 and the second impeller used, the water 110 and ground coffee 114 are mixed together. The mixing is allowed to continue for an amount of time selected by a user such that a desired strength of coffee is achieved. When the amount of time passes, the user adjusts the control knob 103 to cause the first impeller 412 and second impeller to stop rotating and allows the ground coffee 114 that has been mixed with the water 110 to settle to the bottom of the strainer 400. The user may then carefully remove the strainer 400 from the brew chamber 104 such that the ground coffee is removed from the brew chamber, leaving a brewed coffee beverage.

Figure 18:
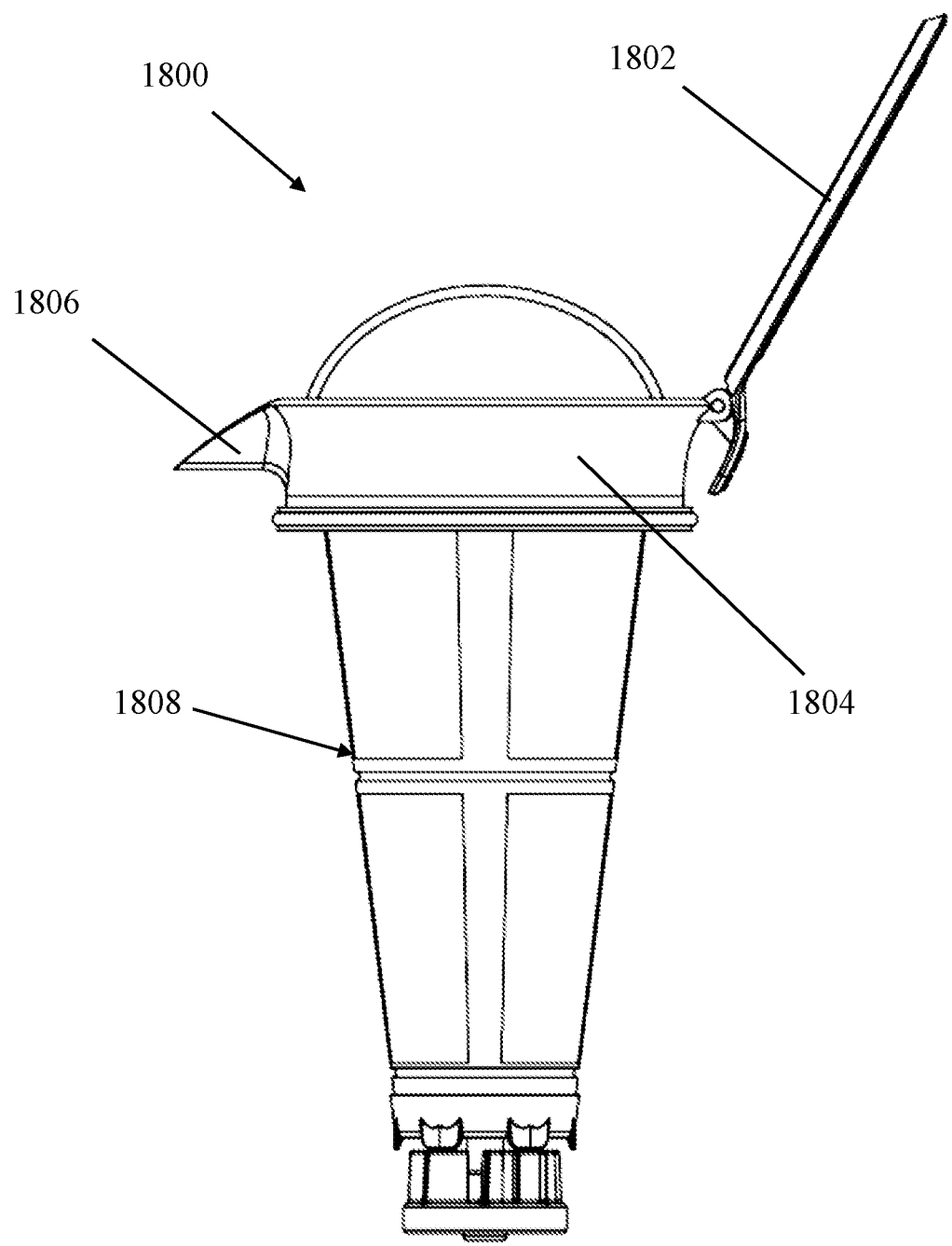
FIG. 18 is a right side view of a strainer/stirrer according to an exemplary embodiment.

FIG. 18 is a side view of another exemplary embodiment of a stirrer/strainer assembly 1800 of a cold brew coffee maker. As is shown, the stirrer/strainer assembly 1800 in the illustrated embodiment includes a covering lid 1802, a rim portion 1804, and a pour spout 1806. A stirrer/strainer 1808 rests on the rim portion 1804 which is placed upon a carafe portion (not illustrated in FIG. 18) of a cold brew coffee maker.

Figure 19:
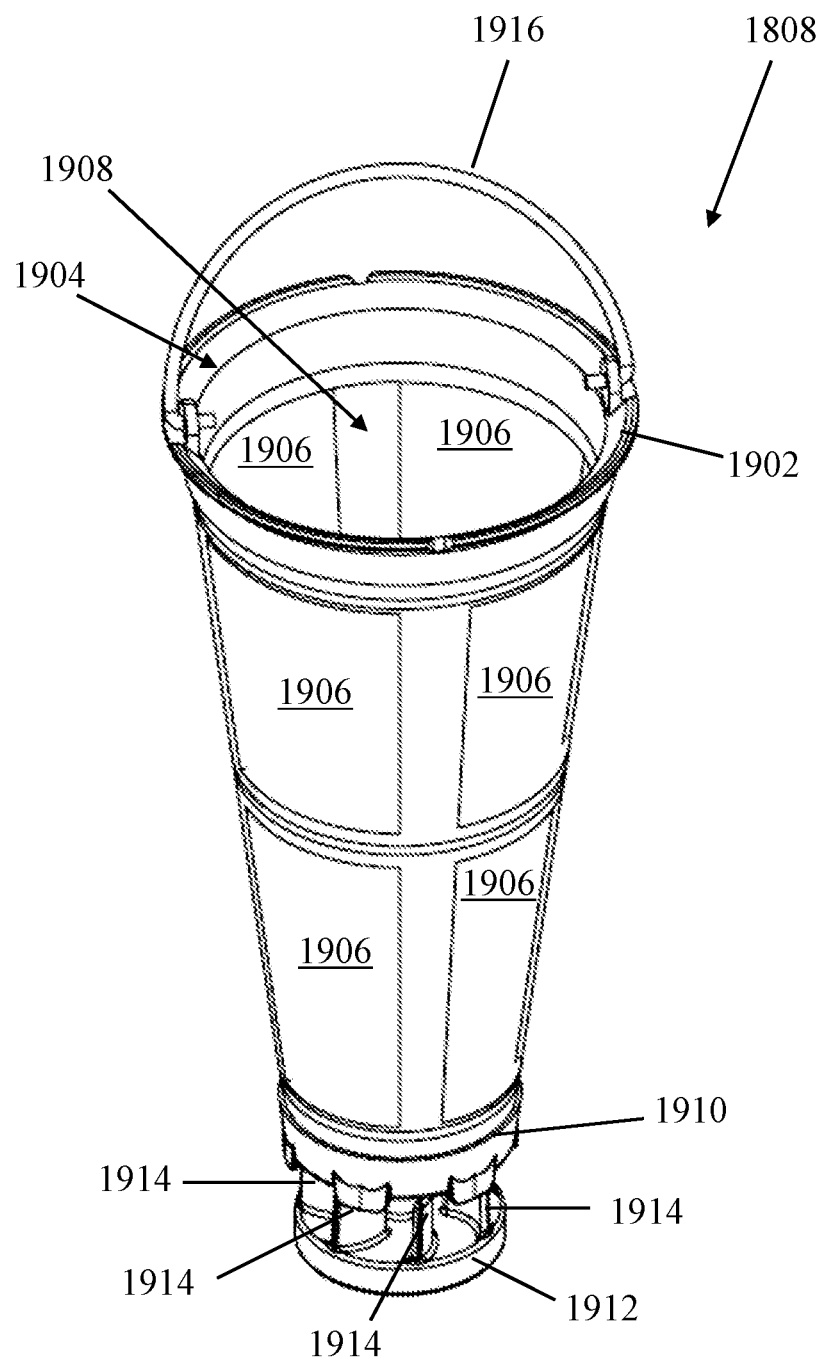
FIG. 19 is a front perspective view of a strainer/stirrer according to an exemplary embodiment.

FIG. 19 illustrates the stirrer/strainer 1808 apart from the remainder of the stirrer/strainer assembly 1800 of FIG. 18. As shown, the stirrer/strainer 1808 comprises an upper portion 1902 with an opening 1904. Although not explicitly shown, a filtering portion 1906 is formed in the stirrer/strainer 1808 to permit liquids to flow from an inner chamber 1908 to an area outside of the stirrer/strainer 1808. The stirrer/strainer 1808 also comprises a base portion 1910 which incorporates an impeller 1912. The impeller itself comprises a plurality of fins 1914 which are shown with a curved surface to facilitate movement of liquids through the filtering portion 1906 when in use. Ground coffee, tea or other materials are added to the stirrer/strainer 1808 when positioned in the carafe portion of a cold brew coffee maker. The filtering portion 1906 is configured such that the ground coffee, tea, or other materials are predominantly retained inside the inner chamber 1908. In order to accomplish this, the filtering portion 1906 comprises many small openings which are two small to be illustrated in the figures provided herein. One of ordinary skill in the art will understand that filtering portions 1906 can include meshes, screens, paper filters, and the like. It will also be understood that the use of the word "predominantly" with regard to containing the coffee, tea, and other materials simply acknowledges that small particles from the coffee, tea, and other materials may pass through the filter when in use. Also illustrated in FIG. 19 is a bail handle 1916 which facilitates removal of the stirrer/strainer portion 1808 from the rim portion 1804 of the stirrer/strainer assembly 1800. Other handles, grips, or tabs may be used to facilitate removal without departing from the inventive concept illustrated herein.

Figure 20:
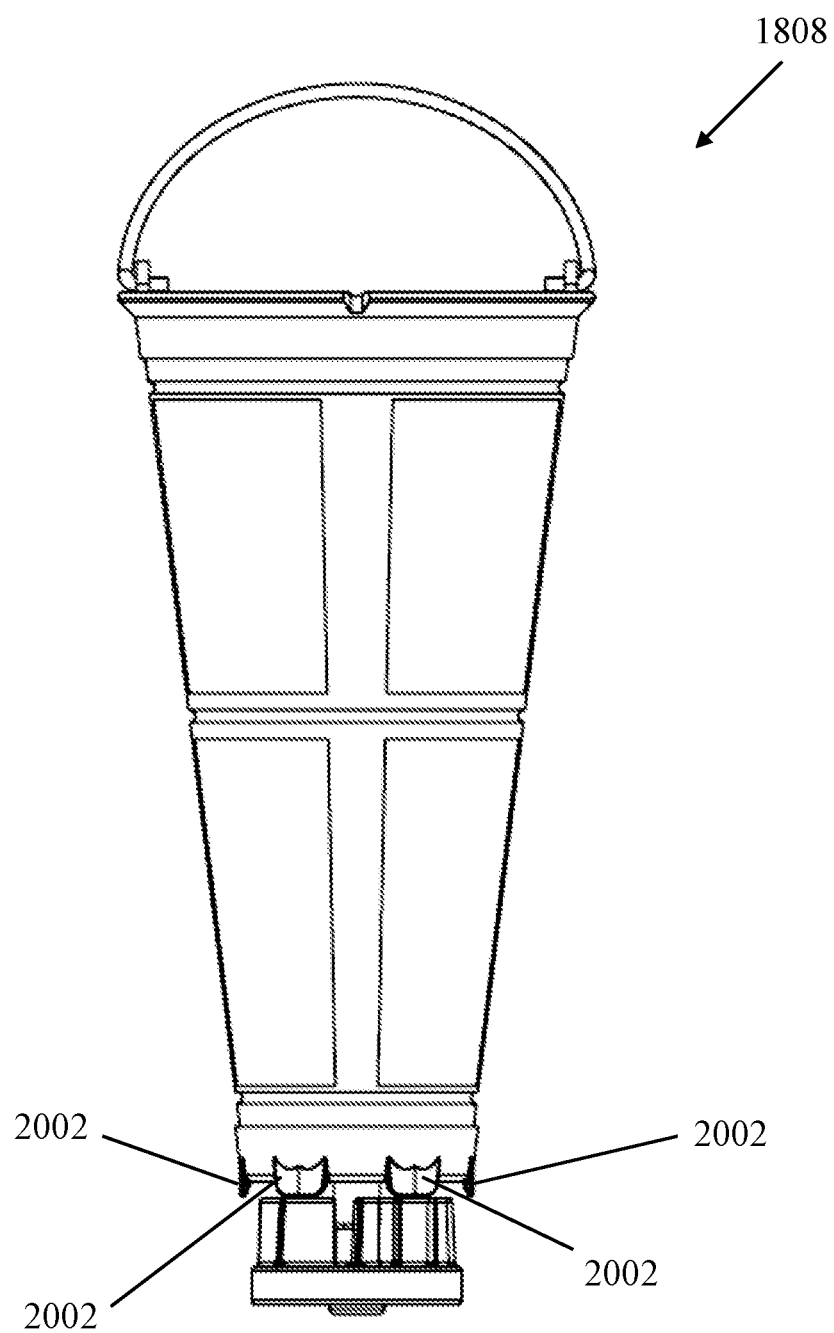
FIG. 20 is a front view of the strainer/stirrer of FIG. 19.
Figure 21:
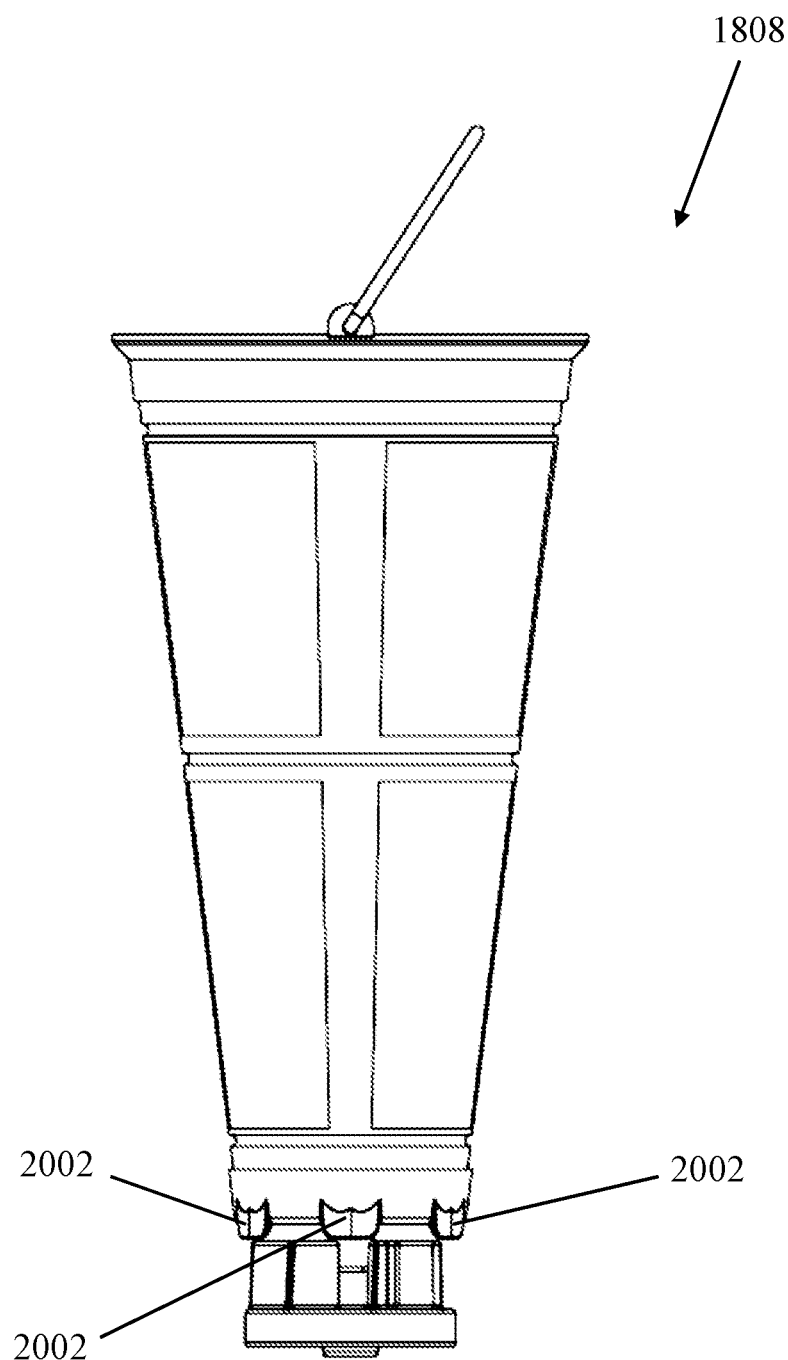
FIG. 21 is a right side view of the strainer/stirrer of FIG. 19.

FIGS. 20 and 21 show different views of the stirrer/strainer portion 1808. Of particular note in these figures are the tab portions 2002 which can be used to suspend the stirrer/strainer portion 1808 from the rim portion 1804 to allow liquids to drain from the inner chamber 1908 into a carafe (not shown).

Figure 22:
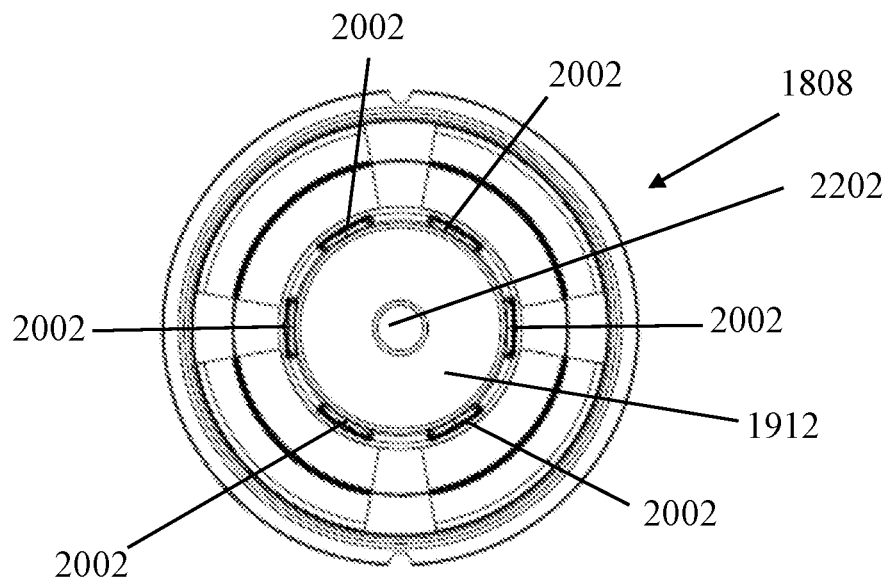
FIG. 22 is a bottom view of the strainer/stirrer of FIG. 19.
Figure 23:
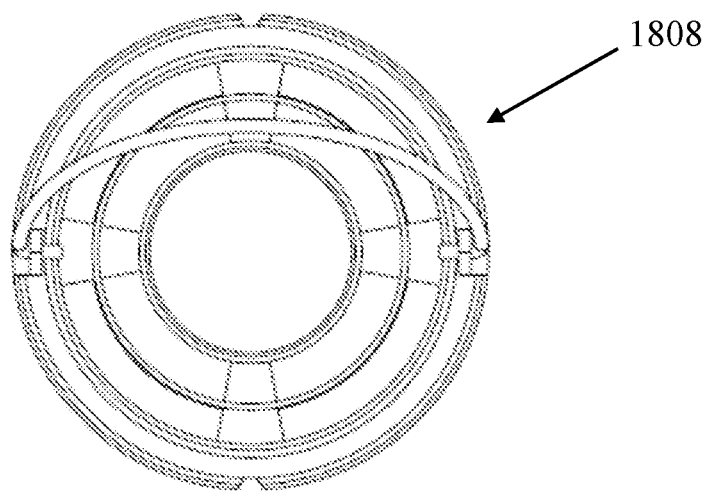
FIG. 23 is a top view of the strainer/stirrer of FIG. 19.

FIG. 22 illustrates a bottom view of the stirrer/strainer 1808. Visible are the tab portions 2002. Also shown is a spindle 2202 around which the impeller 1912 rotates during use. A top view of the stirrer/strainer 1808 is shown in FIG. 23.

Figure 24A:
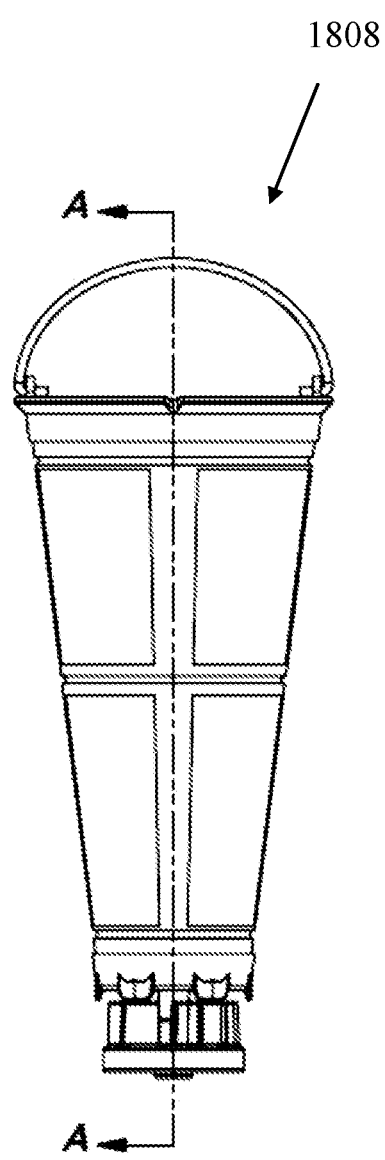
FIGS. 24A and 24B are a front view and a section view the strainer/stirrer of FIG. 19.
Figure 24B:
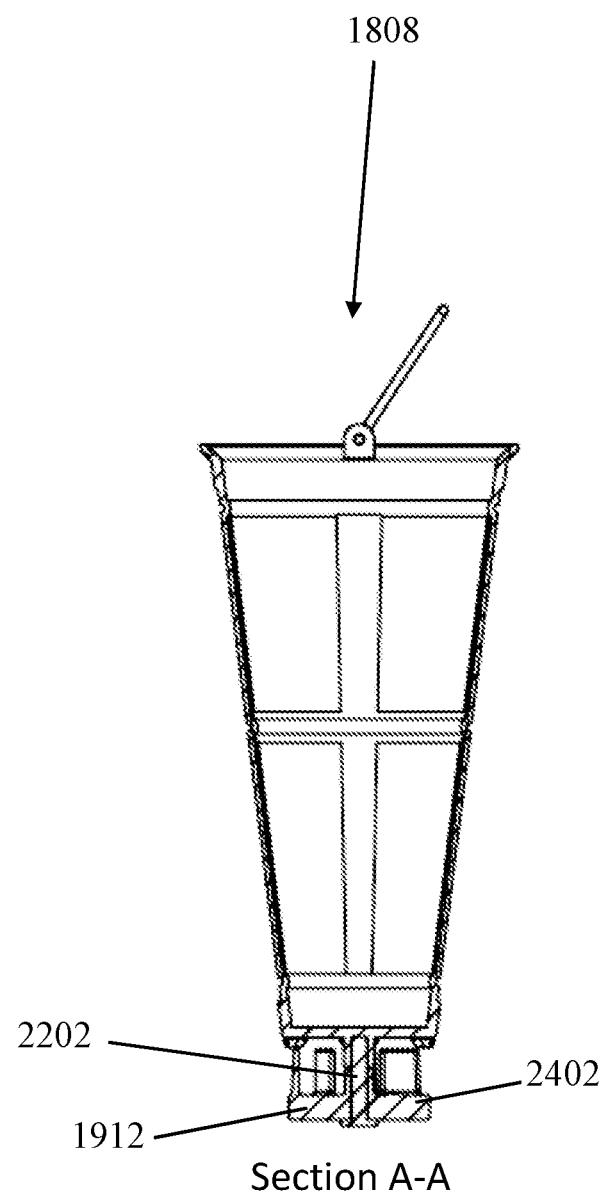

FIGS. 24A and 24B show a side view and a cutaway view of the stirrer/strainer 1808. The cutaway view of FIG. 24B illustrates the spindle 2202 passing through the impeller 1912. As shown, the impeller has a base portion 2402 in which one or more magnets or ferrous portions are positioned. While not visible in FIG. 24B, similar magnets or ferrous portions 1002 were illustrated in FIG. 10 herein.

Figure 25:
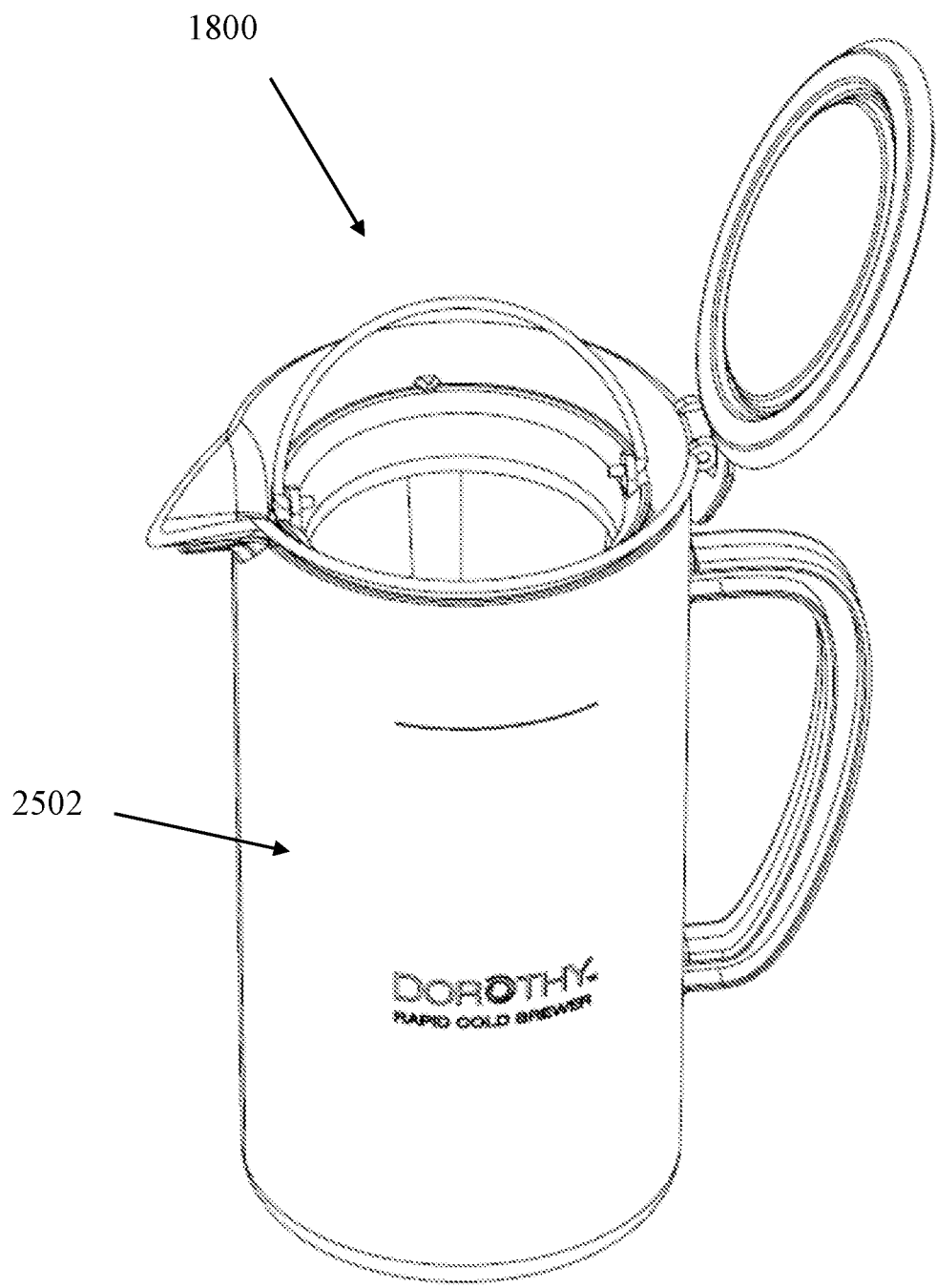
FIG. 25 is a top right perspective view of a carafe portion of a cold brew coffee maker configured with the strainer/stirrer of FIG. 19.
Figure 26:
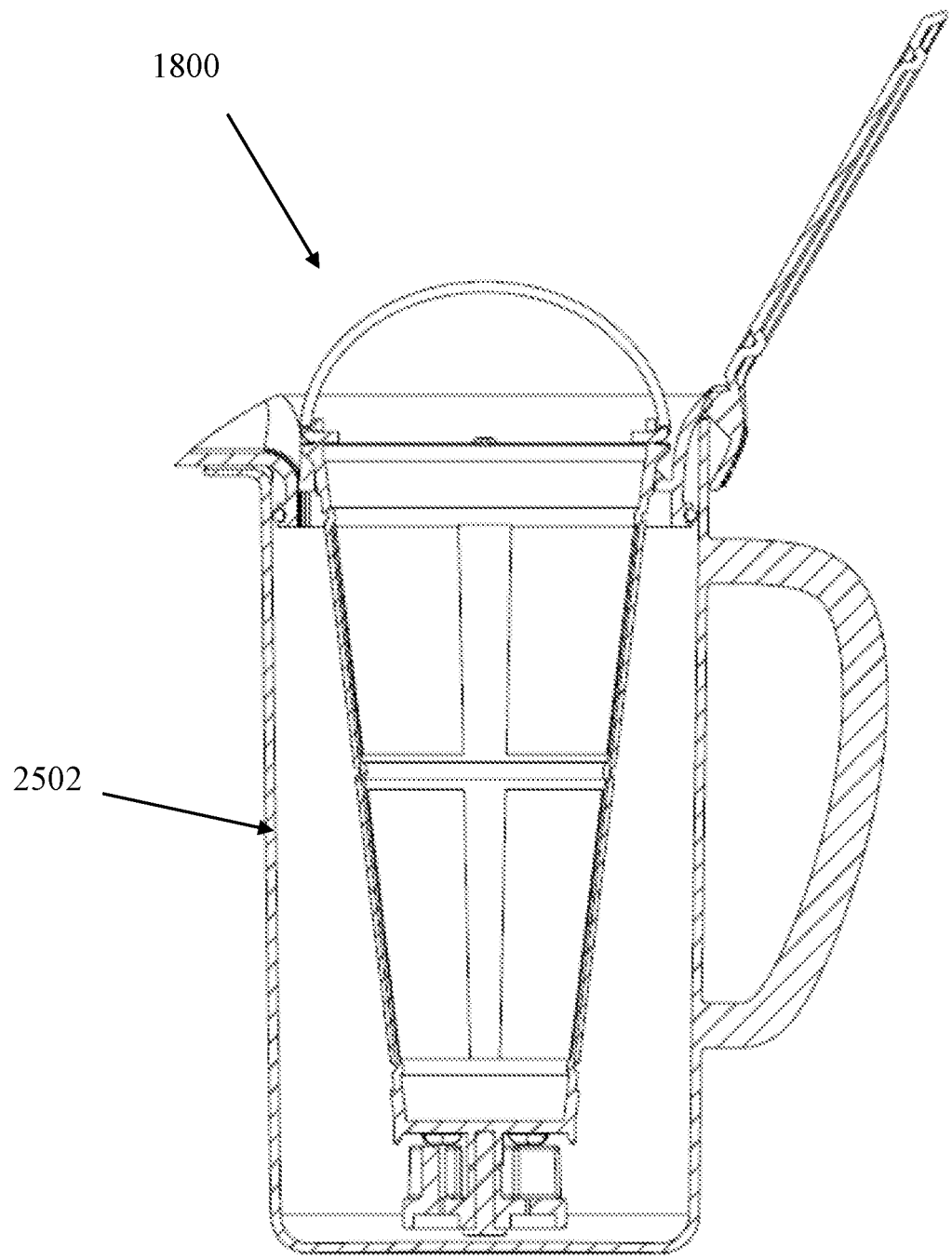
FIG. 26 is a cutaway view of the cold brew coffee maker of FIG. 25.

FIG. 25 shows a perspective view of the stirrer/strainer assembly 1800 positioned within a carafe 2502. FIG. 26 shows a cutaway view of FIG. 25 from a side view. This view illustrates how the stirrer/strainer assembly 1800 rests on the carafe 2502 such that the impeller 1912 is suspended above the lower portion of the carafe 2502.

Figure 27:
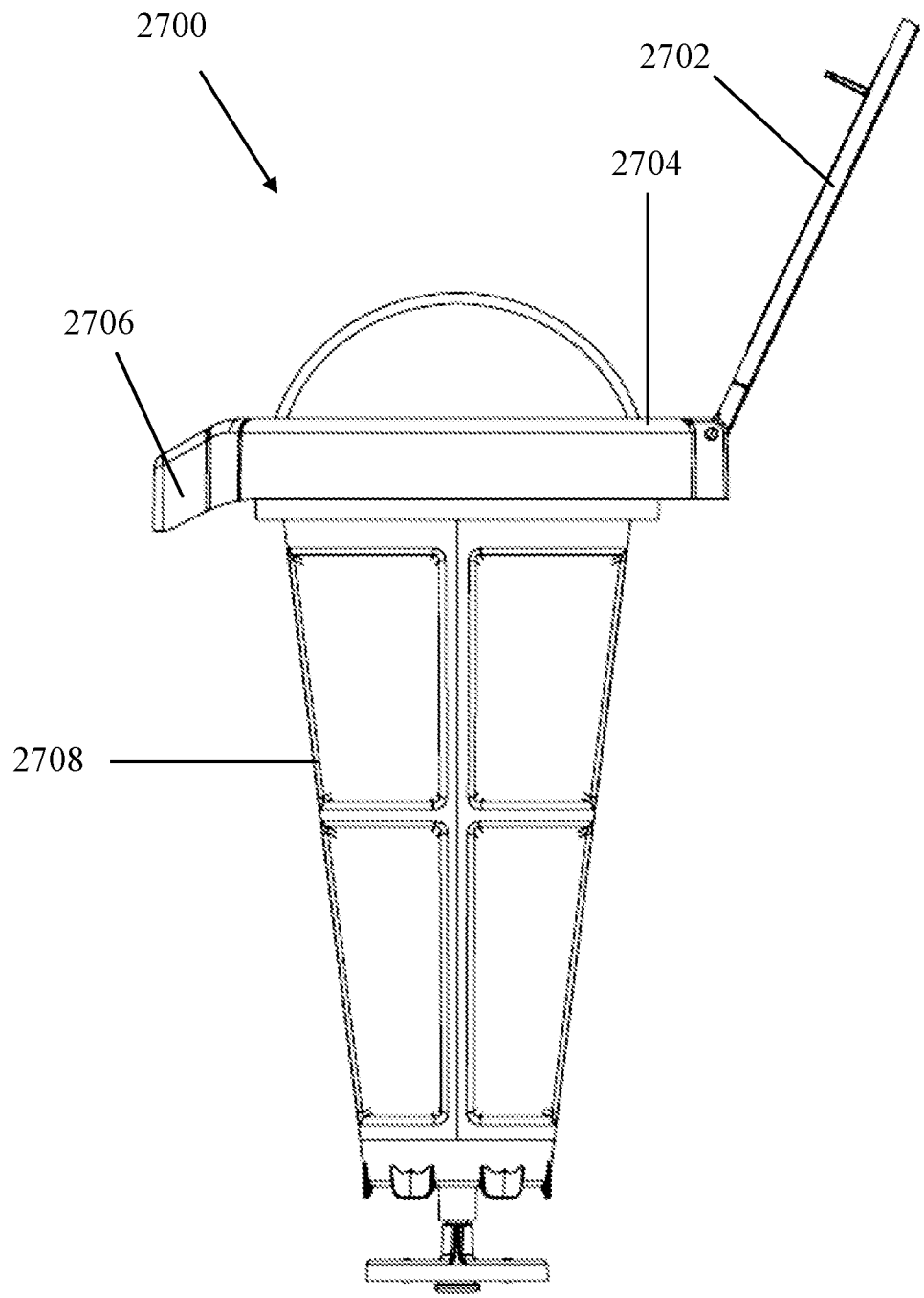
FIG. 27 is a right side view of a strainer/stirrer according to an exemplary embodiment.

FIG. 27 is a side view of yet another exemplary embodiment of a stirrer/strainer assembly 2700 of a cold brew coffee maker. As is shown, the stirrer/strainer assembly 2700 in the illustrated embodiment includes a covering lid 2702, a rim portion 2704, and a spout cover 2706. A stirrer/strainer 2708 rests on the rim portion 2704 which is placed upon a carafe portion (not illustrated in FIG. 27) of a cold brew coffee maker.

Figure 28:
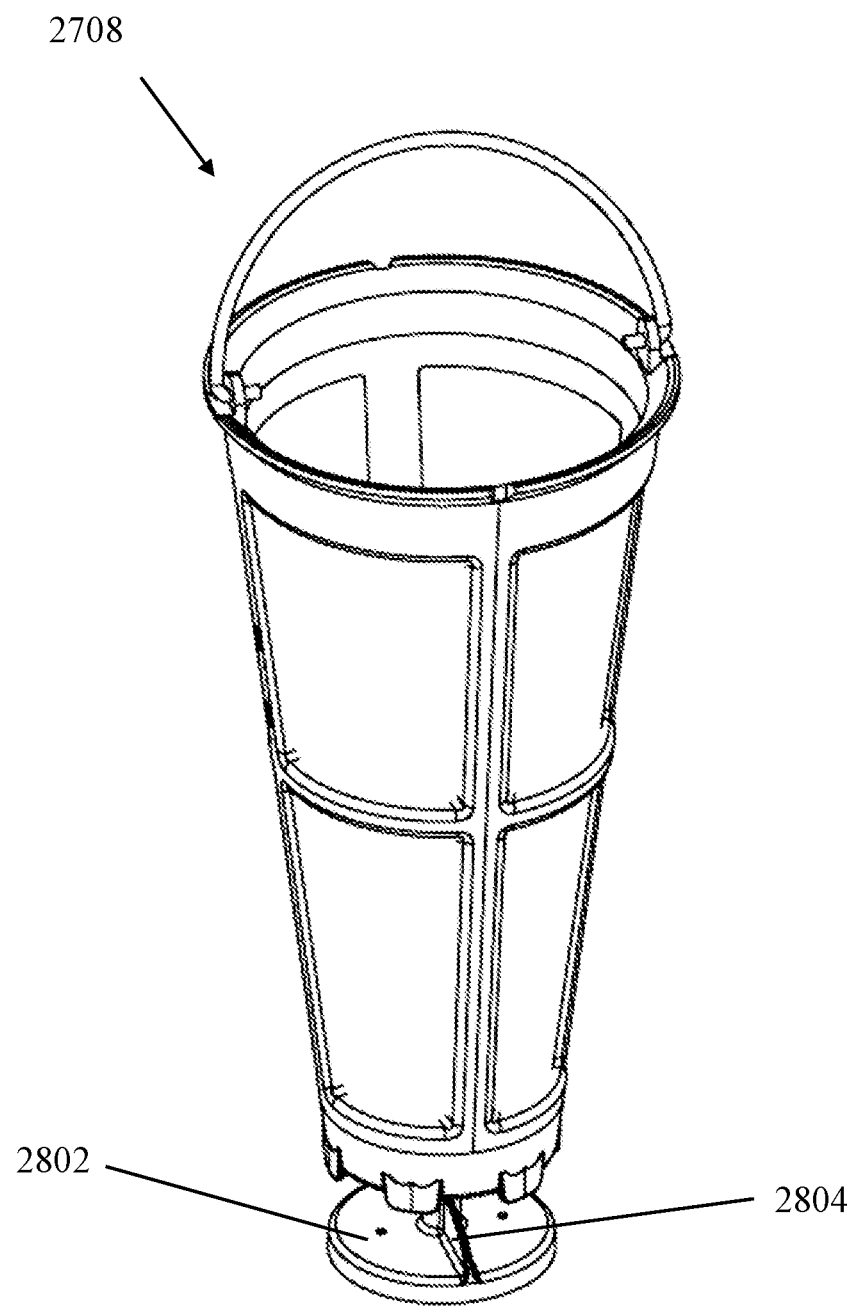
FIG. 28 is a front perspective view of a strainer/stirrer according to an exemplary embodiment.
Figure 29:
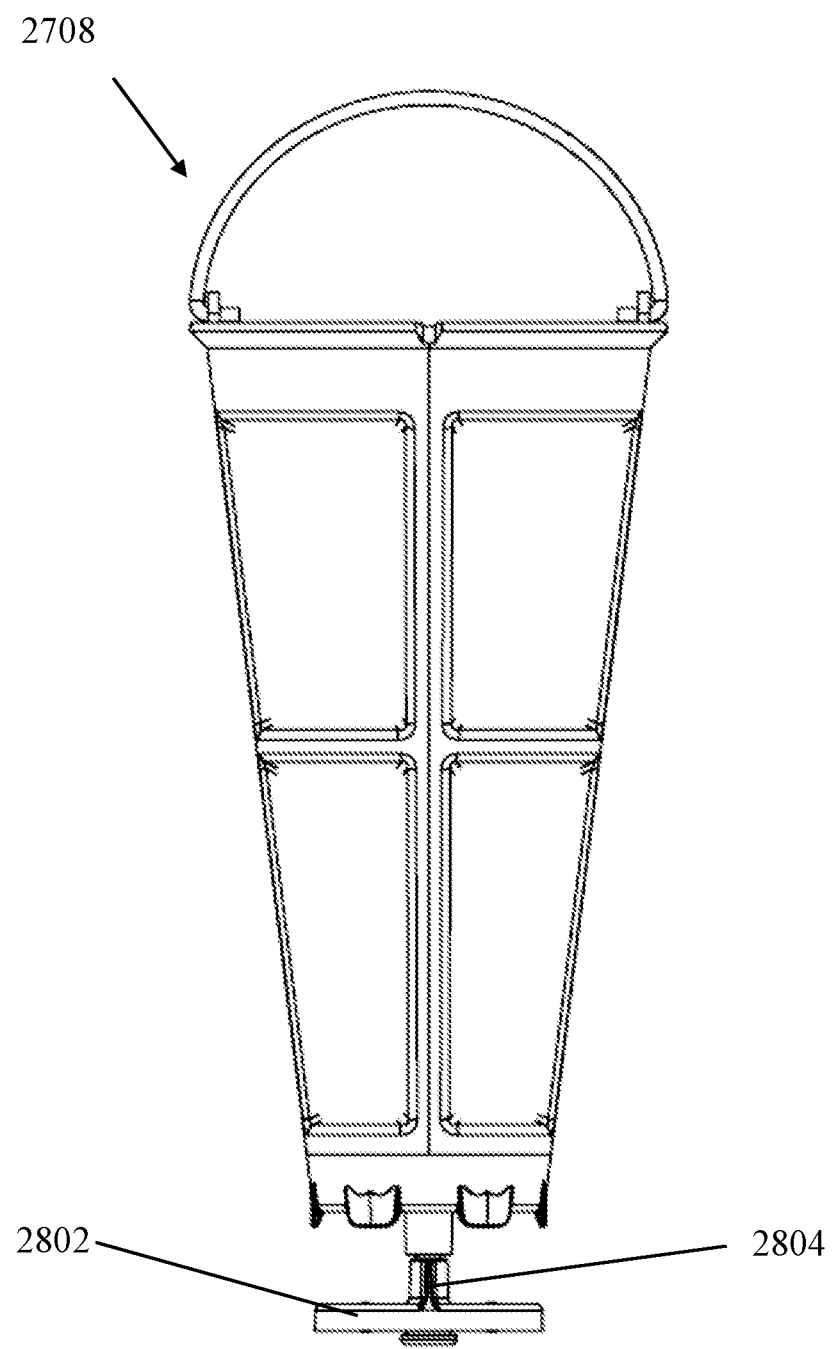
FIG. 29 is a front view of the strainer/stirrer of FIG. 28.
Figure 30:
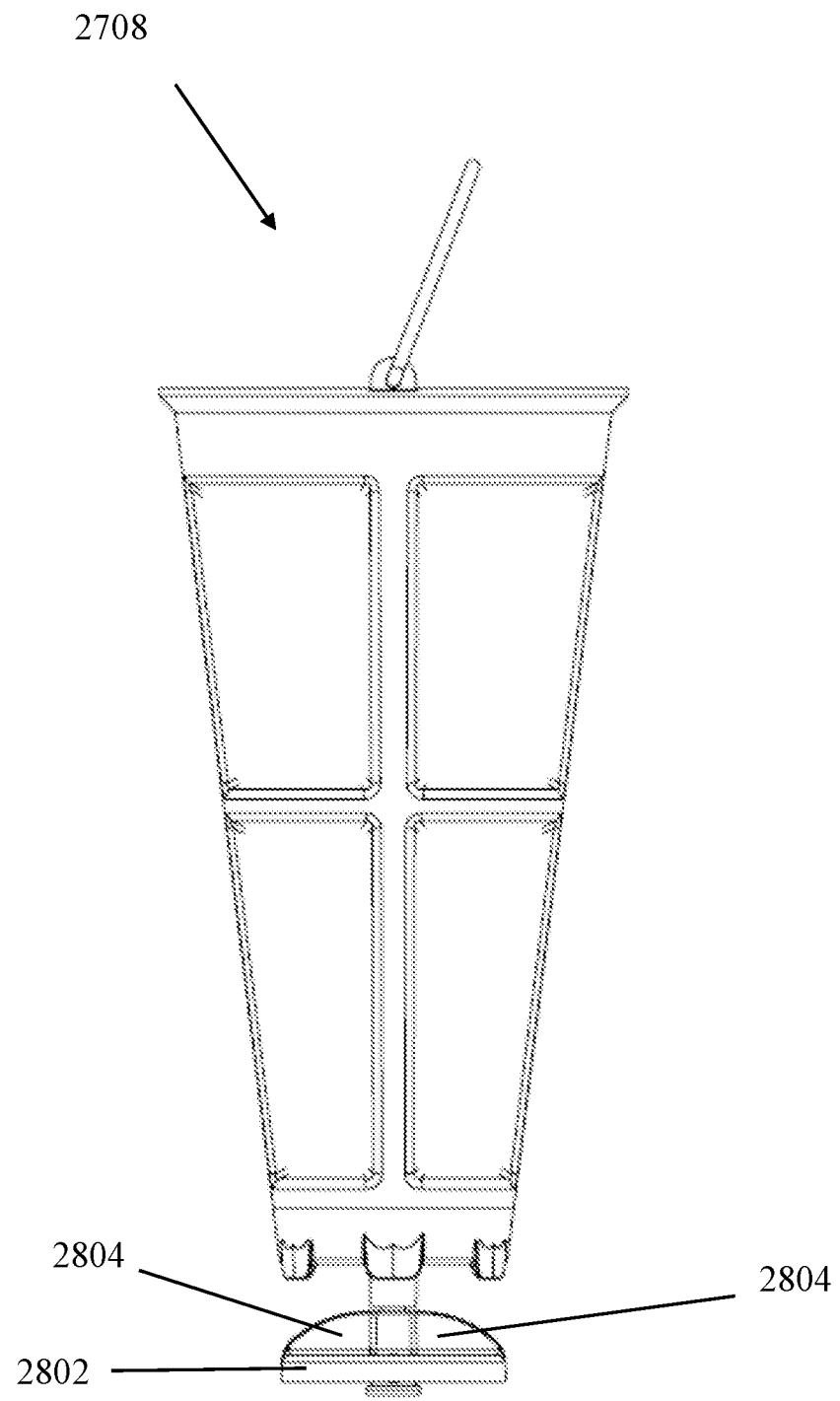
FIG. 30 is a right side view of the strainer/stirrer of FIG. 28.
Figure 31:
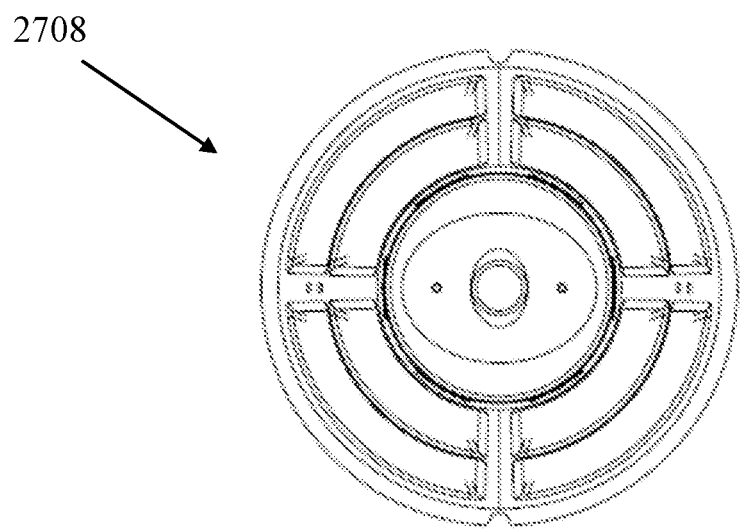
FIG. 31 is a bottom view of the strainer/stirrer of FIG. 28.
Figure 32:
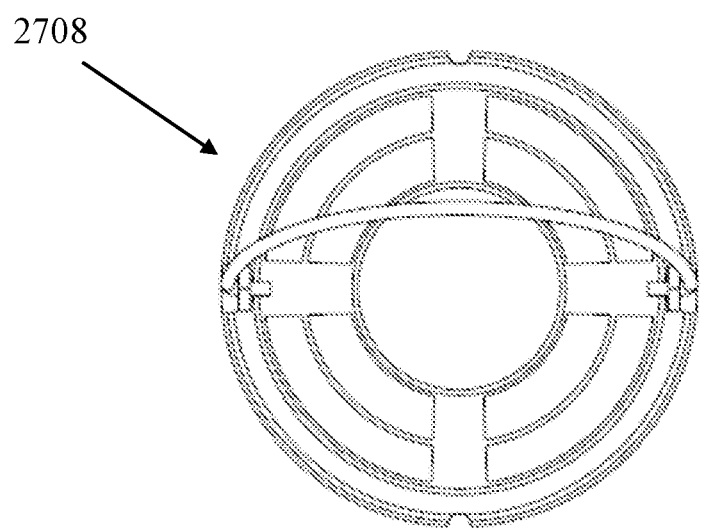
FIG. 32 is a top view of the strainer/stirrer of FIG. 28.

FIG. 28 illustrates a perspective view of the stirrer/strainer 2708. FIGS. 29 and 30 illustrate front and side views respectively of the stirrer/strainer 2708. As shown, the impeller 2802 of this design comprises two fin sections 2804 that have faces that are predominantly flat as illustrated in the FIGS. 28 and 29. FIG. 31 shows a bottom view of the stirrer/strainer 2708 while FIG. 32 illustrates a top view of the stirrer/strainer 2708.

Figure 33A:
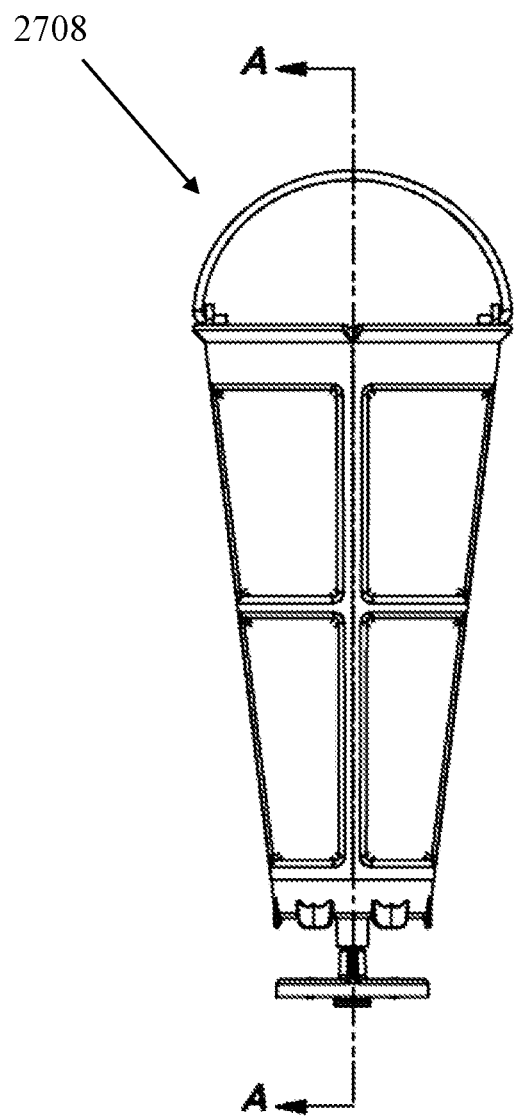
FIGS. 33A and 33B are a front view and a section view of the strainer/stirrer of FIG. 28.
Figure 33B:
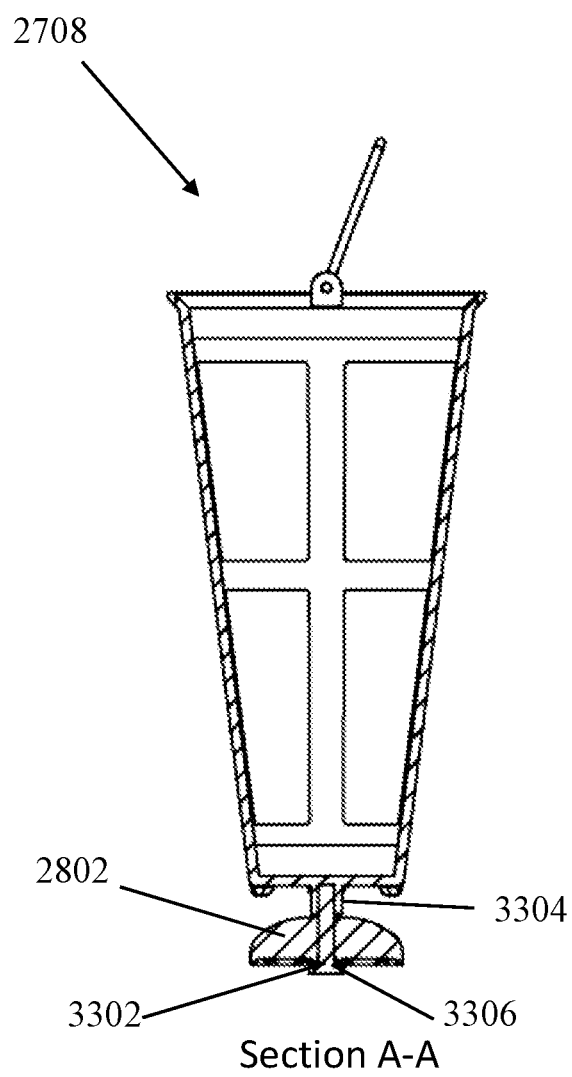

FIG. 33A shows a side view and FIG. 33B shows a cutaway view of the stirrer/strainer assembly 2708. Shown in FIG. 33B is a spindle 3302 and an impeller spacer 3304 which maintains the impeller 2802 in position against the spindle 3302 base flange 3306.

Figure 34:
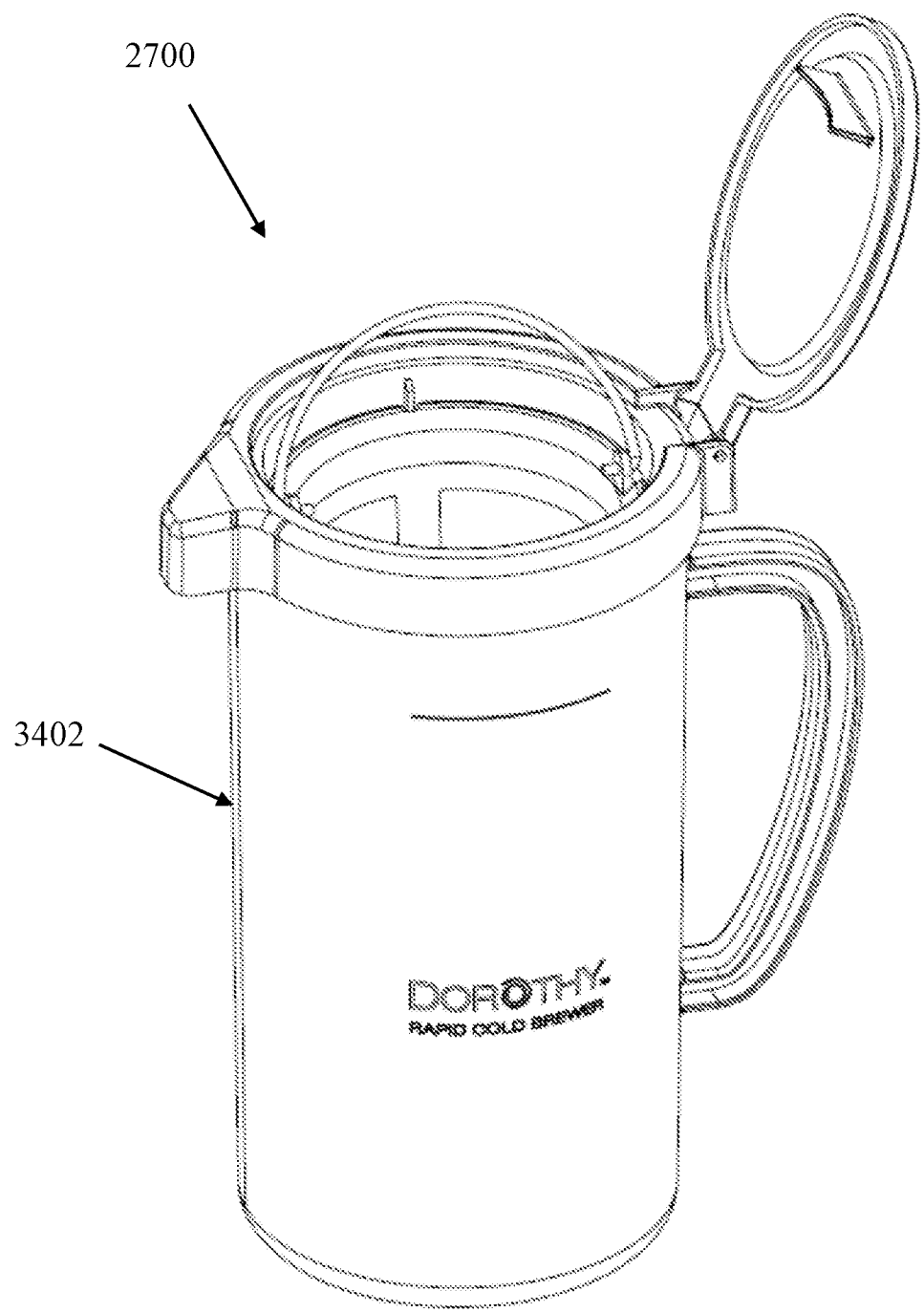
FIG. 34 is a right perspective view of a carafe portion of a cold brew coffee maker configured with the strainer/stirrer of FIG. 28.
Figure 35:
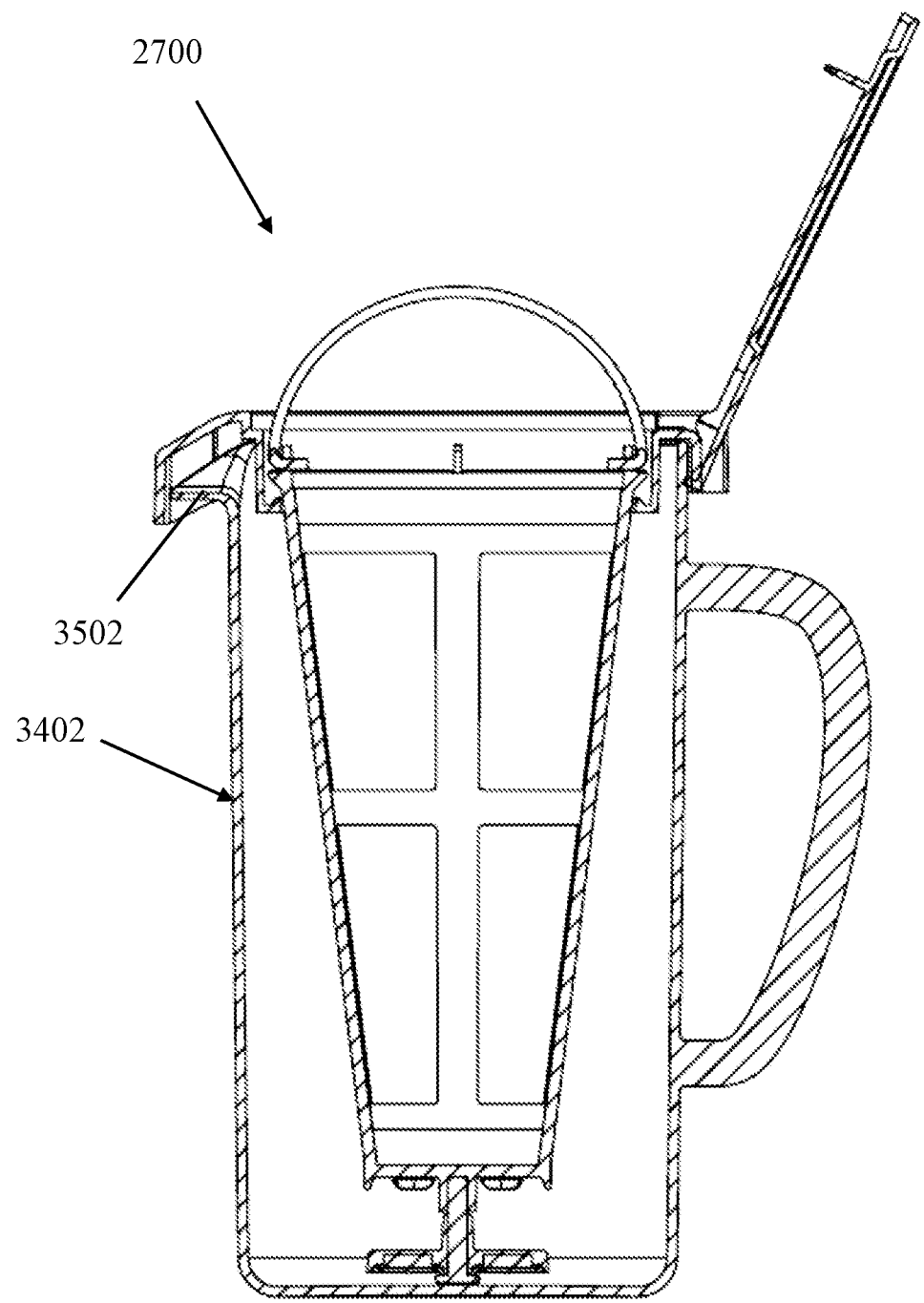
FIG. 35 is a cutaway view of the cold brew coffee maker of FIG. 34.

FIG. 34 shows a perspective view of the stirrer/strainer assembly 2700 positioned within a carafe 3402. FIG. 35 shows a cutaway view of FIG. 34 from a side view. This view illustrates how the stirrer/strainer assembly 2700 rests on the carafe 3402 such that the impeller 2802 is suspended above the lower portion of the carafe 3402. Illustrated in this embodiment is a spout cover 2706 which covers a spout portion 3502 of the carafe 3402.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

Any implementation or embodiment disclosed herein can be combined with any other implementation or embodiment, and references to "an implementation," "some implementations," "one implementation," "an embodiment," "some embodiments," "certain embodiments," or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation or embodiment can be combined with any other implementation or embodiment, inclusively or exclusively, in any manner consistent with the aspects and implementations disclosed herein.

Where technical features in the drawings, detailed description or any claim are followed by reference numbers, the reference numbers have been included to increase the intelligibility of the drawings, detailed description, and claims. Accordingly, neither the reference numbers nor their absence have any limiting effect on the scope of any claim elements.

Coupled elements can be electrically, magnetically, mechanically, or physically coupled with one another directly or with intervening elements. The scope of the systems and methods described herein is thus indicated by the appended claims, rather than the foregoing description, and changes that come within the meaning and range of equivalency of the claims are embraced therein.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the Figures. The orientation of various elements may differ according to other exemplary embodiments, and that such variations are intended to be encompassed by the present disclosure.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

What is claimed is:

1. A device for brewing cold brew coffee comprising:
 a rotation assembly comprising a control and a rotatable magnetic assembly configured to induce a rotating magnetic field at an upper surface of the rotation assembly;
 a brew chamber;
 a strainer/stirrer assembly adapted to be insertable into the brew chamber, the strainer/stirrer assembly comprising:
  a strainer;
  an inner chamber formed by the strainer, the inner chamber having an open portion located at an upper end of the strainer;
  an impeller located adjacent to a lower end of the strainer, and comprising a magnetic element that reacts to the rotating magnetic field the impeller rotatably affixed to the strainer such that the impellor rotates independently of the strainer;

the impeller comprising a plurality of vanes extending from a central axis toward an outer circumference of the impeller.

2. The device for brewing cold brew coffee of claim 1, wherein the impeller comprises a base plate from which the plurality of vanes extend, the magnetic element being located in the base plate.

3. The device for brewing cold brew coffee of claim 1, wherein a spindle extends outwardly from a strainer base portion, the impeller rotatably mounted on the spindle such that the spindle and the impellor rotate independently of the strainer.

4. The device for brewing cold brew coffee of claim 1, wherein the strainer/stirrer assembly comprises a rim portion which contacts the upper portion of the brew chamber to suspend the strainer from the rim portion, the rim portion adapted to rest on an upper rim of the brew chamber.

5. The device for brewing cold brew coffee of claim 4, wherein the rim portion comprises a moveable cover which when in a lowered position covers the open portion of the inner chamber formed by the strainer.

6. The device for brewing cold brew coffee of claim 1, wherein a spindle extends from a strainer base portion into the inner chamber formed by the strainer, the impeller rotatably mounted on the spindle.

7. The device for brewing cold brew coffee of claim 1, wherein the strainer of the strainer/stirrer assembly comprises a filter portion.

* * * * *